United States Patent
Namiki

(10) Patent No.: US 11,494,962 B2
(45) Date of Patent: Nov. 8, 2022

(54) INFORMATION PROVIDING APPARATUS, INFORMATION PROVIDING METHOD, AND STORAGE MEDIUM FOR PROVIDING INFORMATION ASSOCIATED WITH AN ONBOARD BATTERY

(71) Applicant: HONDA MOTOR CO., LTD., Tokyo (JP)

(72) Inventor: Shigeru Namiki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 121 days.

(21) Appl. No.: 17/015,105

(22) Filed: Sep. 9, 2020

(65) Prior Publication Data
US 2021/0074049 A1  Mar. 11, 2021

(30) Foreign Application Priority Data
Sep. 11, 2019 (JP) .............................. JP2019-165274

(51) Int. Cl.
| | | |
|---|---|---|
| G06T 13/40 | (2011.01) | |
| G06Q 30/02 | (2012.01) | |
| B60L 53/66 | (2019.01) | |
| B60L 58/12 | (2019.01) | |

(52) U.S. Cl.
CPC .............. G06T 13/40 (2013.01); B60L 53/66 (2019.02); B60L 58/12 (2019.02); G06Q 30/0207 (2013.01)

(58) Field of Classification Search
None
See application file for complete search history.

(56) References Cited

U.S. PATENT DOCUMENTS

2014/0195272 A1* 7/2014 Sadiq ..................... G06Q 40/08
  705/4
2016/0092899 A1* 3/2016 Osberg ............... G06Q 30/0207
  705/14.1

FOREIGN PATENT DOCUMENTS

| JP | 2000-307689 | 11/2000 |
| JP | 2001-219795 | 8/2001 |
| JP | 2007-180951 | 7/2007 |
| JP | 2013-105319 | 5/2013 |
| WO | 2014/080678 | 5/2014 |
| WO | 2018/146756 | 8/2018 |

OTHER PUBLICATIONS

Japanese Notice of Allowance for Japanese Patent Application No. 2019-165274 dated Feb. 22, 2022.

* cited by examiner

*Primary Examiner* — Vu Nguyen
(74) *Attorney, Agent, or Firm* — Amin, Turocy & Watson, LLP

(57) ABSTRACT

An information providing apparatus according to an aspect includes an acquirer configured to acquire information on anthropomorphic characters correlated with a battery that stores power for allowing a vehicle to travel, and an information provider configured to provide information on a competition between the anthropomorphic character correlated with the battery and another anthropomorphic character when the vehicle is connected to a charging facility that supplies power to the battery to charge the battery.

9 Claims, 16 Drawing Sheets

| BATTERY ID | PRODUCT NAME | DATE OF START OF USE | NUMBER OF CHARGING TIMES | DETERIORATION STATE | CHARACTER ID |
|---|---|---|---|---|---|
| BAT001 | V001-XXX | 2017/12/05 | 120 | E | CH001 |
| BAT102 | V005-XXX | 2019/07/01 | 8 | A | CH002 |
| BAT209 | V222-XXX | 2018/09/09 | 33 | B | CH204 |
| ... | ... | ... | ... | ... | ... |

| CHARACTER ID | CHARACTER IMAGE | CHARACTER SOUND | DETAILED INFORMATION |
|---|---|---|---|
| CH001 | IM001 | S0001 | GROWTH LEVEL: * * * <br> CHARACTERISTIC: * * * <br> ... |
| CH002 | IM002 | S0002 | GROWTH LEVEL: * * * <br> CHARACTERISTIC: * * * <br> ... |
| CH204 | IM204 | S0204 | GROWTH LEVEL: * * * <br> CHARACTERISTIC: * * * <br> ... |
| ... | ... | ... | ... |

| TRAVEL HISTORY | PURCHASE HISTORY | CHARGE/DISCHARGE HISTORY | ... |
|---|---|---|---|
| * * * | * * * | * * * | ... |

| GROUP ID | CHARACTER ID | CHARACTER IMAGE | CHARACTER SOUND | CHARACTER INFORMATION FOR EACH GROWTH LEVEL |
|---|---|---|---|---|
| GR001 | CH001 | IM001 | S0001 | * * * |
| | CH002 | IM002 | S0002 | * * * |
| | CH003 | IM002 | S0003 | * * * |
| GR002 | CH201 | IM201 | S0201 | * * * |
| | CH202 | IM202 | S0202 | * * * |
| | CH203 | IM203 | S0203 | * * * |
| | CH204 | IM204 | S0204 | * * * |
| . . . | . . . | . . . | . . . | . . . |

| BATTERY ID | CHARGING FACILITY ID | CHARACTER ID | ALLOCATION DATE |
|---|---|---|---|
| BAT001 | | CH001 | 2012/03/06 |
| BAT002 | | CH002 | 2013/10/15 |
| | CS003 | CH203 | 2015/03/06 |
| BAT004 | | CH004 | 2019/05/01 |
| . . . | . . . | . . . | . . . |

| USER ID | VEHICLE ID | HISTORY INFORMATION | | | | PRIVILEGE INFORMATION | COLLECTION INFORMATION |
|---|---|---|---|---|---|---|---|
| | | TRAVEL HISTORY | PURCHASE HISTORY | CHARGE/ DISCHARGE HISTORY | ... | | |
| U001 | V001 | **** | **** | *** | . | **** | *** |
| U002 | V002 | **** | **** | *** | . | **** | *** |
| U003 | V003 | **** | **** | *** | . | **** | *** |
| U004 | V004 | **** | **** | *** | . | **** | *** |
| . | . | . | . | . | . | . | . |

FIG. 11

| | | | | |
|---|---|---|---|---|
| | ⋮ | ⋮ | ⋮ | ⋮ |
| | ⟨CH004⟩ IC02 [PLEASE EXCHANGE BATTERY WITH BATTERY ID BAT004!] ⟨BAT004⟩ | ⟨CH204⟩ 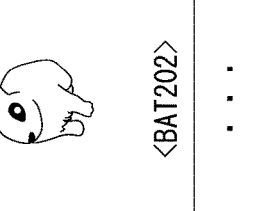 ⟨CS004⟩ | ⟨CH304⟩ IC04 [PLEASE PURCHASE BATTERY ID BAT204!] ⟨BAT204⟩ | ⋮ |
| | ⟨CH003⟩ 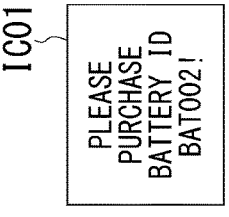 ⟨BAT003⟩ | ⟨CH203⟩ IC03 [PLEASE PERFORM CHARGING AT BATTERY SPOT C!] ⟨CS003⟩ | ⟨CH303⟩ 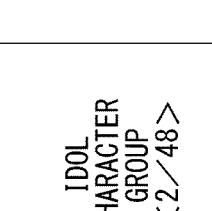 ⟨BAT203⟩ | ⋮ |
| | ⟨CH002⟩ IC01 [PLEASE PURCHASE BATTERY ID BAT002!] ⟨BAT002⟩ | ⟨CH202⟩ 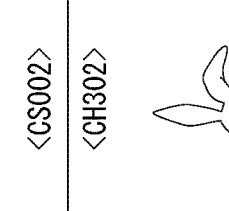 ⟨CS002⟩ | ⟨CH302⟩ 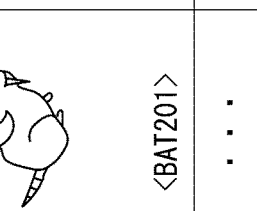 ⟨BAT202⟩ | ⋮ |
| | ⟨CH001⟩ 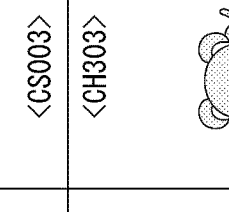 ⟨BAT001⟩ | ⟨CH201⟩ 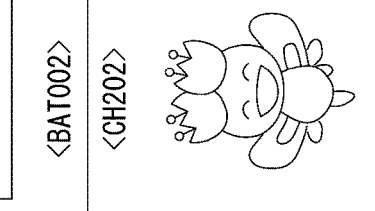 ⟨CS001⟩ | ⟨CH301⟩ 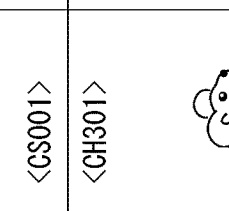 ⟨BAT201⟩ | ⋮ |
| IDOL CHARACTER GROUP ⟨2/48⟩ | | | | |
| LOCAL CHARACTER GROUP ⟨25/100⟩ | | | | |
| MONSTER CHARACTER GROUP ⟨15/80⟩ | | | | ⋮ |

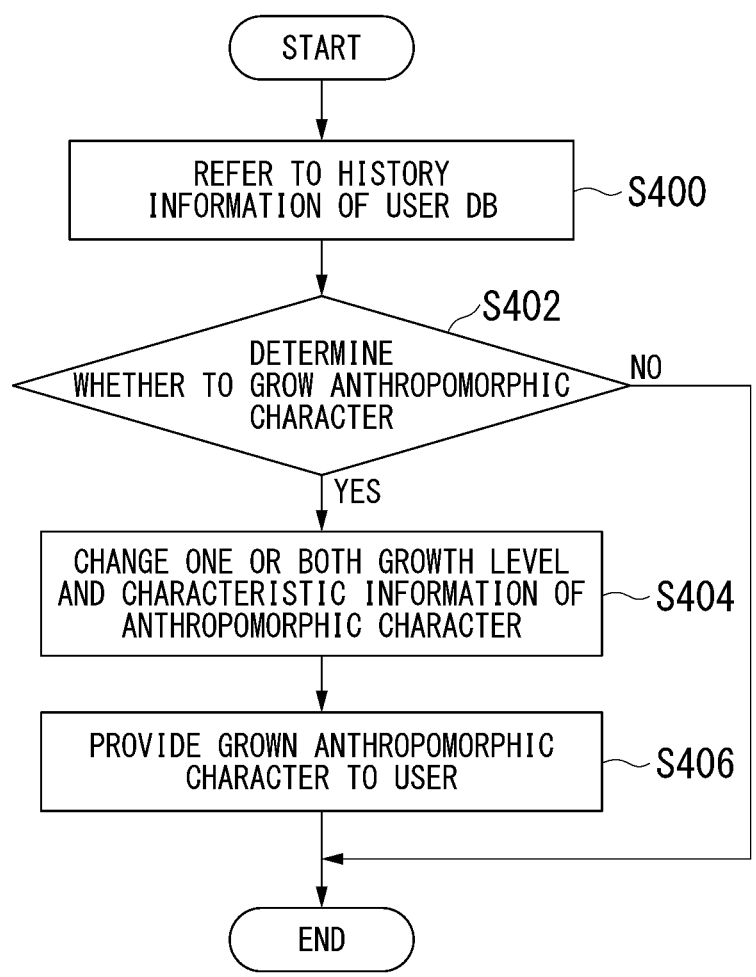

INFORMATION PROVIDING APPARATUS, INFORMATION PROVIDING METHOD, AND STORAGE MEDIUM FOR PROVIDING INFORMATION ASSOCIATED WITH AN ONBOARD BATTERY

CROSS-REFERENCE TO RELATED APPLICATION

Priority is claimed on Japanese Patent Application No. 2019-165274, filed Sep. 11, 2019, the content of which is incorporated herein by reference.

BACKGROUND

Field of the Invention

The present invention relates to an information providing apparatus, an information providing method, and a storage medium.

Description of Related Art

In the related art, a technology of displaying a battery level and a deterioration state of a battery is known (for example, see Japanese Unexamined Patent Application, First Publication No. 2000-307689 and Japanese Unexamined Patent Application, First Publication No. 2007-180951).

SUMMARY

However, in the related art, providing information for promoting better use and recovery of batteries installed in a vehicle has not been considered.

An aspect of the present invention is to provide an information providing apparatus, an information providing method, and a storage medium, by which it is possible to provide information for promoting better use and recovery of batteries installed in a vehicle.

An information providing apparatus, an information providing method, and a storage medium according to the invention employ the following configurations.

(1): An information providing apparatus according to an aspect of the invention includes an acquirer configured to acquire information on anthropomorphic characters correlated with a battery that stores power for allowing a vehicle to travel; and an information provider configured to provide information on a competition between the anthropomorphic character correlated with the battery and another anthropomorphic character when the vehicle is connected to a charging facility that supplies power to the battery to charge the battery.

(2): In the aspect of the aforementioned (1), when a plurality of vehicles are connected to the charging facility, the information provider forms a team for each anthropomorphic character correlated with batteries installed in the plurality of vehicles, and provides a user of the vehicle with information on a competition between the formed teams.

(3): In the aspect of the aforementioned (2), the information provider forms the team on the basis of at least one of a position of the charging facility, a vehicle type of the vehicle installed with the battery, a manufacturer, and a type of the battery.

(4): In the aspect of the aforementioned (1), the information provider determines winning or defeat on the basis of characteristic information and growth levels of the anthropomorphic characters which compete with each other.

(5): In the aspect of the aforementioned (1), the information provider gives a privilege to a user of a vehicle installed with a battery correlated with an anthropomorphic character which has won the competition.

(6): In the aspect of the aforementioned (5), the privilege, which is given to the user of the vehicle installed with the battery correlated with the anthropomorphic character which has won the competition, includes a privilege acquired from the user of the vehicle installed with the battery correlated with the anthropomorphic character which has defeated the competition.

(7): In the aspect of the aforementioned (1), the information provider generates information on ranking based on a result of the competition and provides a user of the vehicle with the generated information on ranking.

(8): An information providing method according to an aspect of the invention causes a computer to perform the steps of: acquiring information on anthropomorphic characters correlated with a battery that stores power for allowing a vehicle to travel; and providing information on a competition between the anthropomorphic character correlated with the battery and another anthropomorphic character when the vehicle is connected to a charging facility that supplies power to the battery to charge the battery.

(9): A storage medium according to an aspect of the invention is a computer readable non-transitory storage medium storing a program causing a computer to perform the steps of: acquiring information on anthropomorphic characters correlated with a battery that stores power for allowing a vehicle to travel; and providing information on a competition between the anthropomorphic character correlated with the battery and another anthropomorphic character when the vehicle is connected to a charging facility that supplies power to the battery to charge the battery.

According to the aspects of (1) to (9), it is possible to provide information for promoting the use and recovery of a battery installed in a vehicle.

BRIEF DESCRIPTION OF THE DRAWINGS

FIG. 3 is a diagram illustrating an example of the content of battery information.

FIG. 4 is a diagram illustrating an example of the content of character information.

FIG. 5 is a diagram illustrating an example of the content of history information.

FIG. 8 is a diagram illustrating an example of the content of a character DB.

FIG. 9 is a diagram illustrating an example of the content of an allocation DB.

FIG. 10 is a diagram illustrating an example of the content of a user DB.

FIG. 11 is a diagram for explaining the content of information provision in a first scene.

FIG. 20 is a flowchart illustrating an example of the flow of a series of processing by the information providing server in the fourth scene.

DESCRIPTION OF EMBODIMENTS

Hereinafter, an embodiment of an information providing apparatus, an information providing method, and a storage medium of the present invention will be described with reference to the drawings.

Overall Configuration

Figure 1:
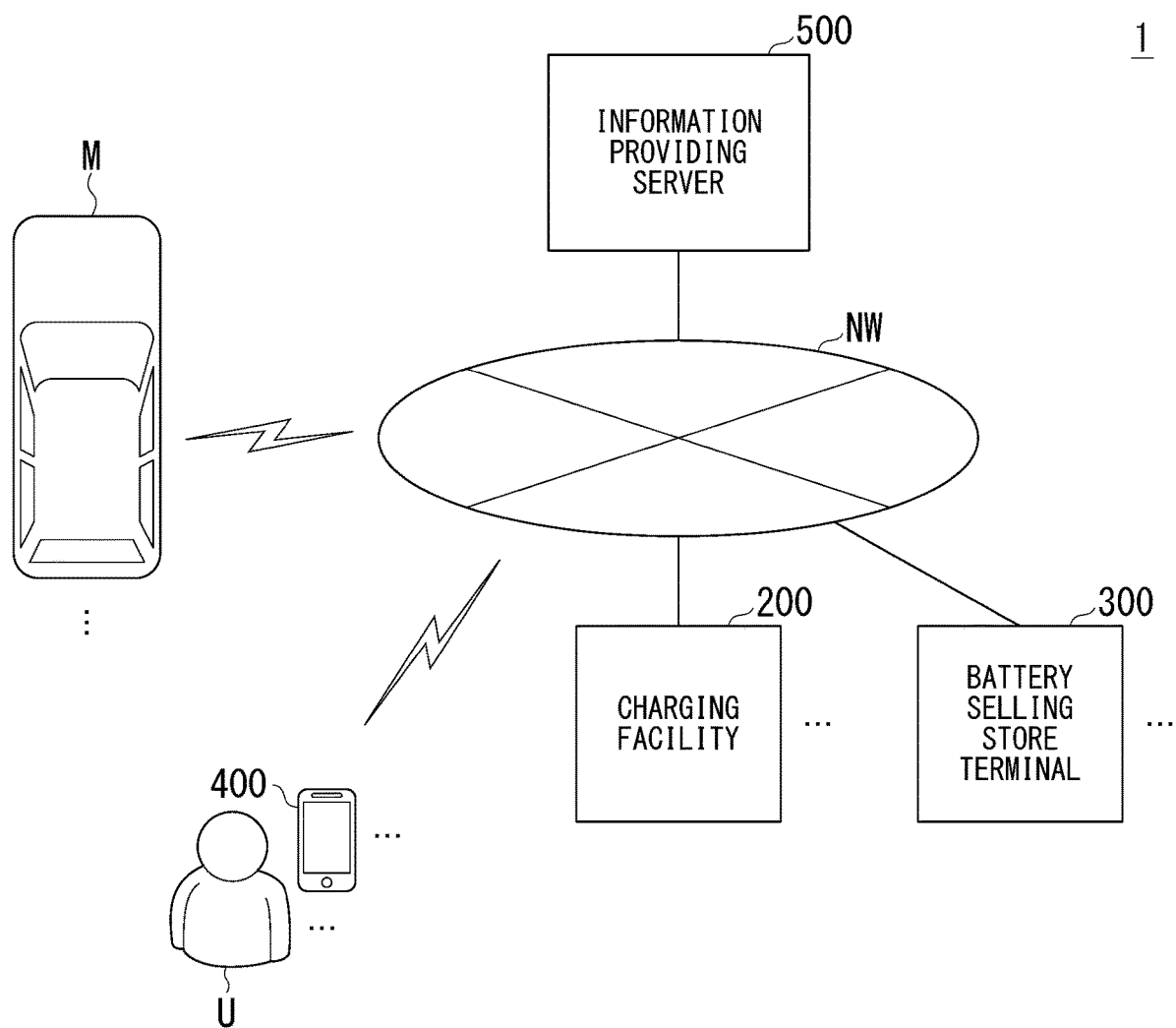
FIG. 1 is a configuration diagram of an information providing system including an information providing apparatus of an embodiment.

FIG. 1 is a configuration diagram of an information providing system 1 including an information providing apparatus of an embodiment. The information providing system 1 includes, for example, one or more vehicles M, one or more charging facilities 200, one or more battery selling store terminals 300, a terminal apparatus 400, and an information providing server 500. The vehicles M, the charging facilities 200, the terminal apparatus 400, and the information providing server 500 can communicate with each other via a network NW, for example. The network NW includes, for example, a cellular network, a Wi-Fi network, Bluetooth (registered trademark), the Internet, a wide area network (WAN), a local area network (LAN), a public line, a provider device, a dedicated line, a wireless base station, and the like. The information providing server 500 is an example of an "information providing apparatus".

The vehicle M is a vehicle with two wheels, three wheels, four wheels and the like, for example, and its driving source is an internal combustion engine such as a diesel engine and a gasoline engine, an electric motor, or a combination thereof. The electric motor operates by using power generated by a generator connected to the internal combustion engine or power discharged from a battery (storage battery). Hereinafter, it is assumed that one or more batteries are installed in the vehicle M. Hereinafter, the batteries may be a battery pack unit or a battery module unit. The battery may be replaced with a cell. The vehicle M transmits information on a traveling status and the installed batteries, and the like to the information providing server 500 via the network NW, or receives information transmitted from the information providing server 500 and provides the received information to a user U, who is in the vehicle M, and the like.

The charging facility 200 is a facility for charging the one or more batteries installed in the vehicle M. For example, the charging facility 200 is provided, for example, in a parking lot of a home or a commercial facility, other charging spots, and the like. The charging facility 200 may transmit, for example, information on the charged battery to the information providing server 500 via the network NW.

The battery selling store terminal 300 is a terminal installed in a battery selling store (for example, a dealer) that sells a new or used (reused) battery to the user U. The battery selling store terminal 300 transmits information on a battery purchased or exchanged by the user U, information on the vehicle M provided with the battery, and the like to the information providing server 500 via the network NW.

The terminal apparatus 400 is used by the user U who uses the vehicle M. The terminal apparatus 400 is, for example, a smart phone or a tablet terminal. The terminal apparatus 400 transmits the operation content of the user U to the information providing server 500 via the network NW, or outputs information received from the information providing server 500 and provides the information to the user U.

The information providing server 500 unitarily manages information on the user U and the vehicle M. The information on the user U and the vehicle M includes, for example, history information on traveling history of the vehicle M, purchase history and charge/discharge history of the battery installed in the vehicle M, and the like. The information on the user U and the vehicle M may include information on an anthropomorphic character acquired (collected) by the user U and information on privilege information given to the user U. For example, the information providing server 500 allocates an anthropomorphic character to each battery installed in the vehicle M and manages each battery. The information providing server 500 acquires information on the purchase or exchange of the battery by the user U or information on the charge/discharge of the battery installed in the vehicle M, which is obtained from the charging facility 200, transmits information on anthropomorphic characters correlated with the battery, the charging facility 200, a battery selling store and the like (for example, performance information on images, sounds, behaviors and the like of anthropomorphic characters) to the vehicle M or the terminal apparatus 400 on the basis of the acquired information, and provides the information to the user U.

The image of the anthropomorphic character (hereinafter, referred to as a character image) is, for example, an image imitating a person, an animal, a plant, or an imaginary creature. The character image may include, for example, a face image that allows a viewer (a user and the like) to recognize an expression and a face orientation, and a display mode in which sizes, characteristics and the like can be identified. The characteristics include, for example, the personality, attributes, attack power, defense power, and the like of the anthropomorphic character. For example, in the character image, parts simulating eyes and nose are represented in a face area, the expression and the face orientation may be recognized on the basis of the positions of the parts in the face area. The character image may be an image which is three-dimensionally perceived by the viewer and in which the face orientation of the character is recognized by including a head image in a three-dimensional space. The character image may include an image of a main body (body or limbs) in which the movement, behavior, posture and the like of the character are recognized. The character image may be an animation image. For example, the character image may be one of components included in an image set including a plurality of images. The image set includes, for example, a plurality of character images correlated with the growth of the anthropomorphic character, items (for example, weapons, protective equipment, and ornaments) available by the anthropomorphic character, and the like. The sound of the anthropomorphic character (hereinafter, referred to as a character sound) is a sound for recalling that the anthropomorphic character is speaking. The character sound may be one of components included in a sound set including a plurality of sounds. The sound set includes a sound correlated with each character image included in the image set.

Next, functions of each of the vehicle M, the terminal apparatus 400, and the information providing server 500 will be described in detail.

Vehicle

Figure 2:
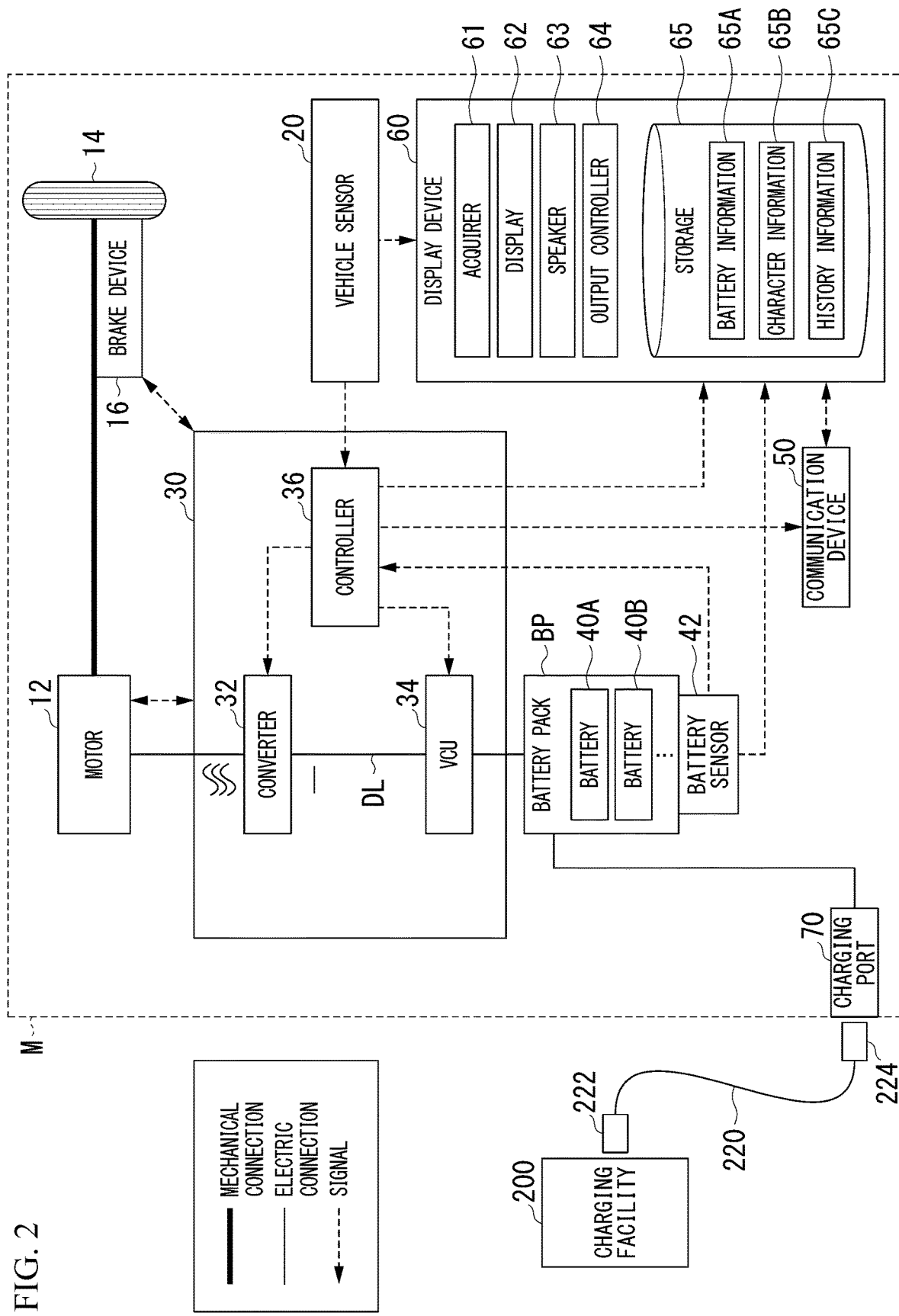
FIG. 2 is a diagram illustrating an example of a configuration of a vehicle according to the embodiment.

FIG. 2 is a diagram illustrating an example of a configuration of the vehicle M according to the embodiment. The vehicle M includes, for example, a motor 12, a driving wheel 14, a brake device 16, a vehicle sensor 20, a power control unit (PCU) 30, one or more batteries 40A, 40B, . . . , a battery sensor 42, a communication device 50, a display device 60, and a charging port 70. The one or more batteries 40A, 40B, . . . are accommodated in a battery pack BP. Hereinafter, when describing the one or more batteries 40A, 40B, . . . without distinguishing them from each other, it is assumed that they are simply referred to as "batteries 40".

The motor 12 is, for example, a three-phase AC electric motor. A rotor of the motor 12 is connected to the driving wheel 14. The motor 12 outputs power to the driving wheel 14 by using supplied power. The motor 12 generates power by using the kinetic energy of the vehicle when the vehicle is decelerating.

The brake device 16 includes, for example, a brake caliper, a cylinder for transferring hydraulic pressure to the brake caliper, and an electric motor for generating the hydraulic pressure in the cylinder. The brake device 16 may have a backup mechanism for transferring the hydraulic pressure generated by an operation of a brake pedal to the cylinder via a master cylinder. The brake device 16 is not limited to the configuration described above and may be an electronically controlled hydraulic pressure brake device that transfers the hydraulic pressure of the master cylinder to the cylinder. When the brake device 16 operates, the motor 12 generates a regenerative current. The regenerative current may charge the batteries 40.

The vehicle sensor 20 includes, for example, an accelerator opening sensor, a vehicle speed sensor, a brake stepping amount sensor, a position sensor, and a temperature sensor. The accelerator opening sensor is attached to the accelerator pedal and detects an operation amount of the accelerator pedal as an accelerator opening. The vehicle speed sensor includes, for example, a wheel speed sensor attached to each vehicle wheel and a speed calculator, and integrates the wheel speeds detected by the wheel speed sensors to derive the speed of the vehicle (vehicle speed). The brake stepping amount sensor is attached to the brake pedal and detects an operation amount of the brake pedal as a brake stepping amount. The position sensor acquires position information of the vehicle M by using a global navigation satellite system (GNSS) receiver (not illustrated), for example. The temperature sensor detects temperature outside the vehicle or temperature inside the vehicle. Each information acquired by each sensor described above is output to a controller 36 or the display device 60.

The PCU 30 includes, for example, a converter 32, a voltage control unit (VCU) 34, and the controller 36. Integrating these components as the PCU 30 is a merely example, and these components may be disposed in a distributed manner.

The converter 32 is, for example, an AC-DC converter. A DC-side terminal of the converter 32 is connected to a DC link DL. The battery 40 is connected to the DC link DL via the VCU 34. The converter 32 converts an alternating current generated by the motor 12 into a direct current and outputs the direct current to the DC link DL.

The VCU 34 is, for example, a DC-DC converter. The VCU 34 boosts power supplied from the batteries 40 and outputs the boosted power to the DC link DL.

The controller 36 includes, for example, a motor controller, a brake controller, and a battery.VCU controller. The motor controller, the brake controller, and the battery.VCU controller may be replaced with separate control devices, for example, control devices such as a motor ECU, a brake ECU, and a battery ECU.

The controller 36 controls the motor 12 on the basis of the output of the vehicle sensor 20 in the motor controller. The controller 36 controls the brake device 16 on the basis of the output of the vehicle sensor 20 in the brake controller. The controller 36 calculates a state of charge (SOC; hereinafter, referred to as a "battery charge rate") on the basis of the output of the battery sensor 42 attached to the battery 40 in the battery.VCU controller, and outputs the battery charge rate to the VCU 34 and the display device 60. The controller 36 outputs information on the vehicle speed output by the vehicle sensor 20 to the display device 60. The VCU 34 increases the voltage of the DC link DL according to an instruction from the battery.VCU control.

Each of the batteries 40A, 40B, . . . accommodated in the battery pack BP is, for example, a secondary battery such as a lithium ion battery. The battery 40 stores power for allowing the vehicle M to travel. For example, the battery 40 stores and charges power supplied from the charging facility 200 outside the vehicle M, and performs discharge for traveling of the vehicle M. The battery sensor 42 includes, for example, a current sensor, a voltage sensor, and a temperature sensor. The battery sensor 42 detects, for example, a current value, a voltage value, and a temperature of the battery 40 by each sensor. The battery sensor 42 may count the number of charging times of the battery 40. The number of charging times is, for example, the number of times by which the battery 40 has been charged by the charging facility 200. The number of charging times may include the number of times by which the battery 40 has been charged by the regenerative current described above. The number of charging times may be the number of charging times for each battery accommodated in the battery pack BP. The battery sensor 42 outputs the detected information and the number of charging times to the controller 36 or the display device 60.

The controller 36 estimates the degree of deterioration of the battery 40 or learns the deterioration state of the battery 40 on the basis of the information acquired from the battery sensor 42. For example, the controller 36 calculates the current full charge capacity (hereinafter, referred to as a "current maximum capacity") of the battery 40. On the basis of the current maximum capacity and an initial maximum capacity, the controller 36 calculates a maximum capacity ratio (deterioration state) of the current maximum capacity to the initial maximum capacity. The initial maximum capacity is the full charge capacity of the battery 40 at the time of shipment. The controller 36 performs statistical processing such as clustering processing on the calculation results of the full charge capacity, the SOC, the charge/discharge power, the maximum capacity ratio, and the like. With this, the controller 36 can learn the deterioration state of the battery 40. The controller 36 may derive the degree of deterioration of the battery 40 on the basis of a value obtained by dividing an integrated value ΔI[Ah] of a charging current of the battery 40 between a first time point and a second time point after the elapse of a predetermined time, which is different from the first time point, by a difference ΔSOC [%] between a first charging rate of the battery 40 and a second charging rate of the battery 40.

The controller 36 outputs the calculation results to the display device 60. Moreover, the controller 36 may calculate a usage frequency of the battery 40 and output the usage frequency to the display device. The usage frequency may be, for example, the operating degree (boarding frequency) of the vehicle M, or may indicate the frequency of charging or discharging of the battery 40.

The communication device 50 includes a wireless module for connecting a cellular network or a Wi-Fi network. The communication device 50 transmits information, which is output from the controller 36 and the display device 60, to the terminal apparatus 400 and the information providing server 500 via the network NW. The communication device 50 receives information transmitted by the terminal apparatus 400 and the information providing server 500 and outputs the received information to the display device 60.

The display device 60 includes, for example, an acquirer 61, a display (example of a display) 62, a speaker 63, an output controller 64, and a storage 65. The acquirer 61 and the output controller 64 are implemented by, for example, a hardware processor such as a central processing unit (CPU) that executes a program (software). Some or all of these components may be implemented by hardware (a circuit unit: including circuitry) such as a large scale integration (LSI), an application specific integrated circuit (ASIC), a field-programmable gate array (FPGA), and a graphics processing unit (GPU), or may be implemented by software and hardware in cooperation. The program may be stored in advance in a storage device (non-transitory storage medium) such as a hard disk drive (HDD) and a flash memory, or may be installed when a detachable storage medium (non-transitory storage medium) storing the program, such as a DVD and a CD-ROM, is mounted on a drive device. The display 62 and the speaker 63 are examples of an "output".

The storage 65 may be implemented by the aforementioned each storage device, or an electrically erasable programmable read only memory (EEPROM), a read only memory (ROM), a random access memory (RAM), and the like. The storage 65 stores, for example, battery information 65A, character information 65B, history information 65C, a program, and other various information. FIG. 3 is a diagram illustrating an example of the content of the battery information 65A. In the battery information 65A, for example, a product name, a date of start of use, the number of charging times, a deterioration state, and a character ID are correlated with a battery ID which is identification information for identifying batteries. The product name is information on a product name or a model of the battery. The date of start of use is a date in which the battery 40 is installed in the vehicle. The number of charging times is, for example, the number of charging times of the battery 40 detected by the battery sensor 42. The deterioration state is an index value indicating the degree of deterioration of the battery estimated by the controller 36. In the example of FIG. 3, a corresponding deterioration level among deterioration levels A to E is stored as the index value. It is assumed that the deterioration levels A to E satisfy the relation of "A<B<C<D<E". Consequently, the deterioration level A indicates that the degree of deterioration of the battery 40 is smaller than the other levels and the deterioration level E indicates that the degree of deterioration of the battery 40 is larger than the other levels. The character ID is identification information for identifying the anthropomorphic characters. The character ID may include an item ID as identification information for identifying items available by the anthropomorphic characters.

FIG. 4 is a diagram illustrating an example of the content of the character information 65B. In the character information 65B, character image information, character sound information, and detailed information are correlated with the character ID. The character image information is information on the image of the anthropomorphic character. The character sound information is information on the sound of the anthropomorphic character. The detailed information is, for example, information on the growth level and characteristics of the anthropomorphic character. The character information 65B is, for example, information received from the information providing server 500.

FIG. 5 is a diagram illustrating an example of the content of the history information 65C. The history information 65C includes, for example, information on travel history, purchase history, charge/discharge history, and the like of the vehicle M.

These types of information are managed together with time information, respectively. The travel history includes, for example, information on the accelerator opening, the vehicle speed, the brake stepping amount, the position of the vehicle, and the temperature outside the vehicle or the temperature inside the vehicle, which are acquired from the vehicle sensor 20. The travel history may include, for example, information on a travel route, a travel time, a travel distance, and the like of the vehicle M. The purchase history includes, for example, information on a type, and a purchase date or an exchange date of each installed battery 40. The purchase history may include, for example, information on a type, and a purchase date or an exchange date of a battery installed in the vehicle M in the past. The charge/discharge history includes, for example, information on a discharge status, a charged point, and a transition of the SOC of the battery 40 during traveling, and the like. The charge/discharge history may include information on a battery temperature, a current value, and a voltage value, which are acquired by the battery sensor 42, and information on the number of charging times and the deterioration state included in the battery information 65A.

The acquirer 61 acquires the information, which is output from the vehicle sensor 20, the controller 36, and the battery sensor 42, and the content received by the communication device 50.

The display 62 is, for example, a liquid crystal display (LCD), an organic electroluminescence (EL) display, and the like. The display 62 is installed, for example, in a meter panel unit including instruments such as a vehicle speedometer provided on an instrument panel in front of a driver's seat provided with a steering wheel in a vehicle interior. The display 62 is installed, for example, around the center of the instrument panel in the vehicle interior. The display 62 may be a display provided with a human machine interface (HMI) of another in-vehicle device (for example, a navigation device). The display 62 displays information (for example, information on the anthropomorphic character, traffic guidance, and vehicle information), which is provided to the user U who gets in the vehicle M, under the control of the output controller 64.

The speaker 63 outputs, for example, a predetermined sound under the control of the output controller 64. The predetermined sound includes, for example, a sound correlated with the anthropomorphic character, a sound correlated with the traffic guidance, the vehicle information and the like, a warning sound, and the like.

The output controller 64 controls, for example, the content or display mode of an image to be displayed on the display 62, and the content or output mode of a sound to be output to the speaker 63. For example, the output controller 64 transmits information, which is input from the vehicle sensor 20, the controller 36, or the battery sensor 42, or information, which is stored in the storage 65, to the terminal apparatus 400 or the information providing server 500. The output controller 64 generates an image based on the information stored in the storage 65 and allows the display 62 to display the image, or allows the speaker 63 to output a predetermined sound corresponding to the image to be displayed. The output controller 64 may allow the display 62 or the speaker 63 to output images or sounds related to information obtained from the controller 36, the vehicle sensor 20, or the battery sensor 42. The output controller 64 may allow each display or the speaker 63 to output information on images, sounds and the like received from the information providing server 500 via the network NW.

Terminal Apparatus

Figure 6:
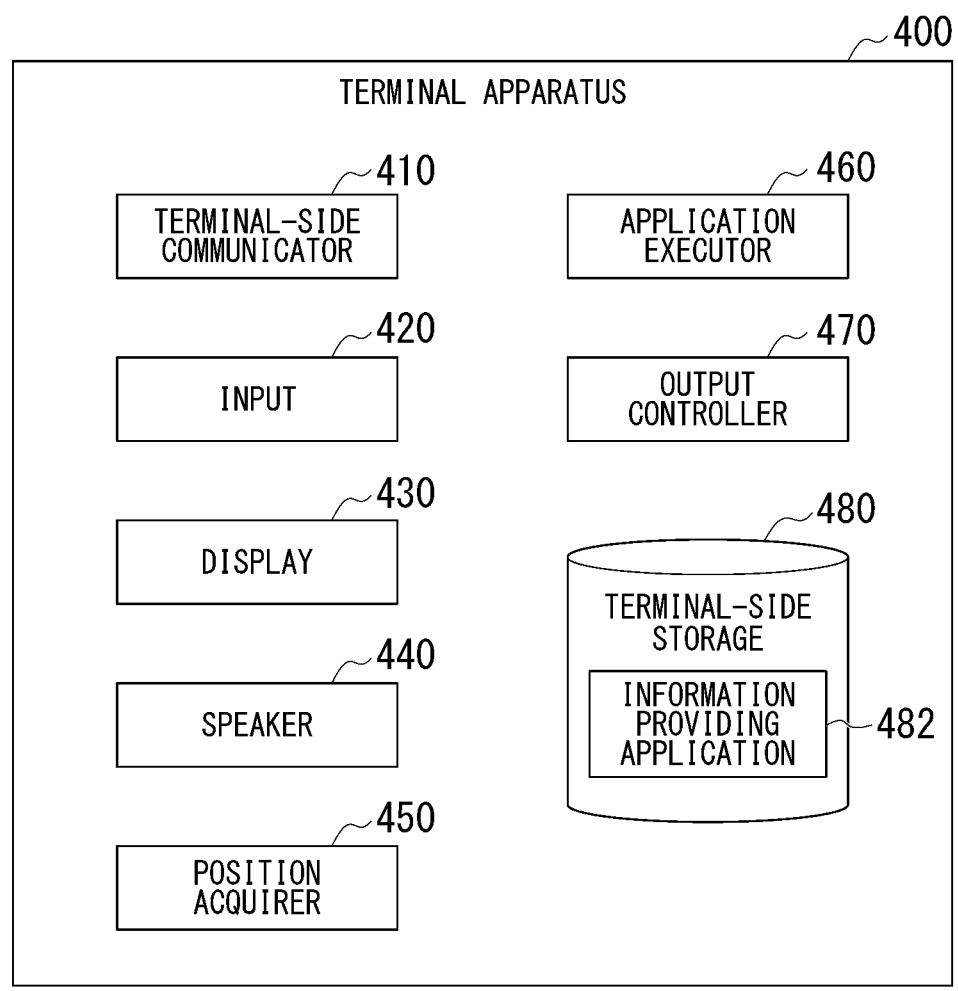
FIG. 6 is a configuration diagram of a terminal apparatus of the embodiment.

FIG. 6 is a configuration diagram of the terminal apparatus 400 of the embodiment. The terminal apparatus 400 is, for example, a terminal apparatus, such as a smart phone and a tablet terminal, which can be carried by a user. The terminal apparatus 400 includes, for example, a terminal-side communicator 410, an input 420, a display 430, a speaker 440, a position acquirer 450, an application executor 460, an output controller 470, and a terminal-side storage 480. The position acquirer 450, the application executor 460, and the output controller 470 are implemented by, for example, a hardware processor such as a CPU that executes a program (software). Some or all of these components may be implemented by hardware (a circuit unit: including circuitry) such as an LSI, an ASIC, a FPGA, and a GPU, or may be implemented by software and hardware in cooperation. The program may be stored in advance in a storage device (storage device including a non-transitory storage medium) such as an HDD and a flash memory of the terminal apparatus 400, or may be installed in the storage device of the terminal apparatus 400 when a detachable storage medium (non-transitory storage medium) storing the program, such as a DVD, a CD-ROM, and a memory card, is mounted on a drive device, a card slot and the like.

The terminal-side storage 480 may be implemented by the aforementioned each storage device, or an EEPROM, a ROM, a RAM, and the like. The terminal-side storage 480 stores, for example, an information providing application 482, a program, and other various information.

The terminal-side communicator 410 communicates with external apparatuses such as the vehicle M and the information providing server 500 by using the network NW, for example.

The input 420 receives, for example, the input of the user U by an operation of various keys, buttons, and the like. The display 430 is, for example, an LCD, an organic EL display, and the like. The input 420 may be integrated with the display 430 as a touch panel. The display 430 displays various types of information in the information providing process in the embodiment under the control of the output controller 470. The speaker 440 outputs a predetermined sound under the control of the output controller 470, for example.

The position acquirer 450 acquires position information of the terminal apparatus 400 by the GNSS receiver (not illustrated) embedded in the terminal apparatus 400, and transmits the acquired position information to the information providing server 500.

The application executor 460 is implemented by executing the information providing application 482 stored in the terminal-side storage 480. The information providing application 482 is an application program for allowing the display 430 to display a character image correlated with an anthropomorphic character correlated with the vehicle M or an in-vehicle device (for example, the battery 40), or allowing the speaker 440 to output a character sound. The information providing application 482 may communicate with the information providing server 500 via the network NW, acquire information on anthropomorphic characters correlated with the user U and the like from the information providing server 500, and allow the acquired information to be displayed on the display 430 or to be output from the speaker 440. The information providing application 482 may display a screen for purchasing an anthropomorphic character or an item, and transmit a purchase request to the information providing server 500 on the basis of an instruction from the user U. The information providing application 482 may acquire information other than the anthropomorphic character (for example, history information of the vehicle M), and allow the acquired information to be displayed on the display 430 or a character sound to be output from the speaker 440.

The output controller 470 controls the content or display mode of an image to be displayed on the display 430, and the content or output mode of a sound to be output to the speaker 440, under the control of the application executor 460.

Information Providing Server

Figure 7:
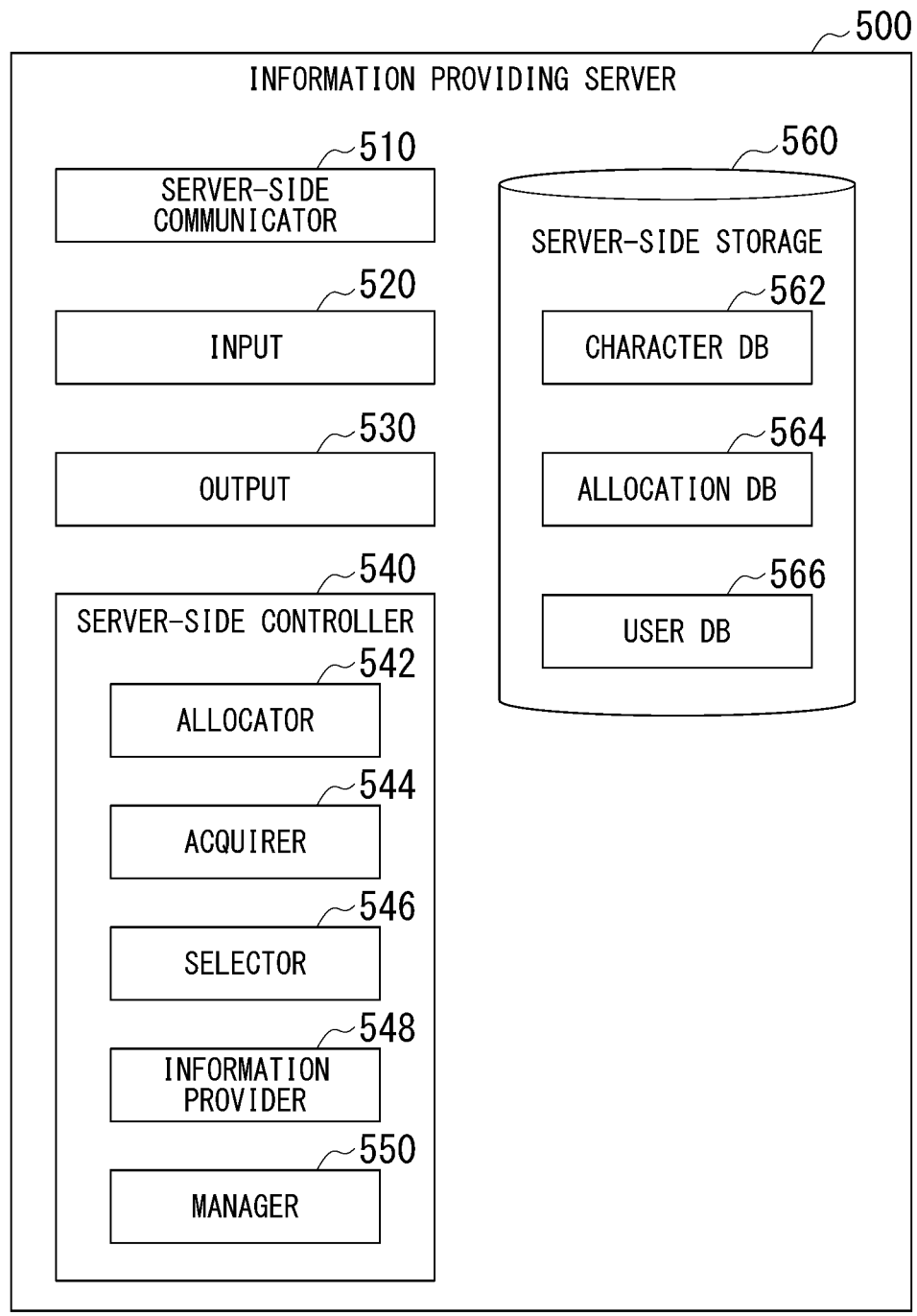
FIG. 7 is a configuration diagram of an information providing server of the embodiment.

FIG. 7 is a configuration diagram of the information providing server 500 of the embodiment. The information providing server 500 includes, for example, a server-side communicator 510, an input 520, an output 530, a server-side controller 540, and a server-side storage 560. The information providing server 500 may serve as, for example, a cloud server that communicates with the vehicle M or the terminal apparatus 400 via the network NW and transmits/receives various data.

The server-side communicator 510 includes a communication interface such as a network interface card (NIC). The server-side communicator 510 communicates with vehicles or other external apparatuses via the network NW by using, for example, a cellular network, a Wi-Fi network, Bluetooth, and the like.

The input 520 is, for example, a user interface such as a button, a keyboard, and a mouse. The input 520 receives operations of a server administrator and the like. The input 520 may be a touch panel configured integrally with a display of the output 530.

The output 530 outputs information to the server administrator and the like. The output 530 includes, for example, the display that displays an image and a sound output that outputs sound. The display includes, for example, a display device such as an LCD and an organic EL display. The display displays an image of information output by the server-side controller 540. The sound output is, for example, a speaker. The sound output outputs the sound of information output by the server-side controller 540.

The server-side controller 540 includes, for example, an allocator 542, an acquirer 544, a selector 546, and an information provider 548. Each component of the server-side controller 540 is implemented by, for example, a hardware processor such as a CPU that executes a program stored in the server-side storage 560. Some or all of the components of the server-side controller 540 may be implemented by hardware (a circuit unit: including circuitry) such as an LSI, an ASIC, a FPGA, and a GPU, or may be implemented by software and hardware in cooperation. The program may be stored in advance in a storage device (storage device including a non-transitory storage medium) such as an HDD and a flash memory of the information providing server 500, or may be installed in the storage device of the information providing server 500 when a detachable storage medium (non-transitory storage medium) storing the program, such as a DVD, a CD-ROM, and a memory card, is mounted on a drive device, a card slot and the like.

The server-side storage 560 may be implemented by, for example, the aforementioned each storage device, or an EEPROM, a ROM, a RAM, and the like. The server-side storage 560 stores, for example, a character DB 562, an allocation DB 564, a user DB 566, a program, and other various information. Details of the character DB 562, the allocation DB 564, the user DB 566 will be described below.

The allocator 542 performs grouping for each of a plurality of anthropomorphic characters, for example. The allocator 542 allocates an anthropomorphic character to each vehicle M or in-vehicle device (for example, each battery 40). The allocator 542 may allocate the anthropomorphic character in correlation with the charging facility 200 or the battery selling store terminal 300. The allocator 542 may also allocate items, instead of (or in addition to) the anthropomorphic characters, or may group the items. The allocator 542 registers information on the allocated content in the character DB 562 or the allocation DB 564, or updates the registered information.

FIG. 8 is a diagram illustrating an example of the content of the character DB 562. In the character DB 562, for example, a character image, a character sound, and character information for each growth level are correlated with a group ID and the character ID. The group ID is, for example, identification information for identifying each group grouped according to predetermined conditions such as the acquisition conditions, type, and characteristics of the anthropomorphic characters. The character image is information on the image of the anthropomorphic character. The character sound is information on the sound of the anthropomorphic character. The character information for each growth level includes, for example, information on a level to which growth is possible, and information on a change in the image, sound, and characteristics of the anthropomorphic character for each growth level. The character DB 562 may include an item ID, instead of (or in addition to) the character ID. In the case of the item ID, an item image, an item sound, and item information for each growth level are stored, instead of the character image, the character sound, and the character information for each growth level.

FIG. 9 is a diagram illustrating an example of the content of the allocation DB 564. In the allocation DB 564, for example, the character ID and an allocation date are correlated with the battery ID or a charging facility ID. The charging facility ID is identification information for identifying the charging facilities 200. The allocation date is the date in which an anthropomorphic character identified by the character ID is allocated to a battery identified by the battery ID. The allocation DB 564 may include information on positions (for example, positions where the charging facilities 200 or the battery selling store terminals 300 exist) or areas, instead of (or in addition to) the battery ID or the charging facility ID. The allocation DB 564 may include the item ID, instead of (or in addition to) the character ID. The character DB 562 and the allocation DB 564 described above may be registered or updated on the basis of, for example, instruction information of an administrator input through the input 520.

The acquirer 544 acquires information transmitted from an external apparatus via the network NW. For example, the acquirer 544 acquires, from the charging facility 200, information on the vehicle M being connected to the charging facility 200, or information on the terminal apparatus 400 that is installed in the vehicle and is being charged. The acquirer 544 acquires, from the battery selling store terminal 300, information on the battery 40 purchased or exchanged by the user U. The acquirer 544 may acquire information such as the battery information 65A and the history information 65C from the vehicle M, or information on an acquisition request of the anthropomorphic character from the vehicle M or the terminal apparatus 400. The acquirer 544 registers the acquired information in the user DB 566, or updates the registered information.

FIG. 10 is a diagram illustrating an example of the content of the user DB 566. In the user DB 566, a vehicle ID as identification information of the vehicle M to be used by the user U, history information, privilege information, and collection information are correlated with a user ID as identification information for identifying the user U. The history information corresponds to the history information 65C acquired from the vehicle M, for example. The privilege information is, for example, a service such as special treatment and benefits to be given to the user U when the vehicle M satisfies predetermined conditions, or information having an economic value. The privilege information may include, for example, service points, electronic coupons (cash vouchers, discount coupons, special coupons), prizes, and other various preferential treatments. The predetermined conditions include, for example, that the vehicle M has moved to a predetermined position, a predetermined vehicle device has been purchased or exchanged, the battery 40 has been charged in a predetermined charging facility 200, and that anthropomorphic characters to be described below have won a competition. The predetermined conditions may include conditions for a driving state of the vehicle M with respect to the user U or a driving status (for example, weather or road shape). The collection information is information on anthropomorphic characters acquired (collected) by the user U up to now. The collection information may include information on an anthropomorphic character currently in use among anthropomorphic characters acquired by the user U. The collection information may include, for example, collection information of anthropomorphic characters grouped for each predetermined attribute. The privilege information and the collection information are managed by a manager 550, for example.

The selector 546 selects an anthropomorphic character or an item to be provided to the user U from the character DB 562 and the allocation DB 564 on the basis of the information acquired by the acquirer 544 or the information stored in the user DB 566. For example, the selector 546 refers to the battery ID of the allocation DB 564 on the basis of the battery ID of the battery 40 purchased by the user U, and refers to the character DB 562 on the basis of a character ID correlated with a matching battery ID. Then, the selector 546 selects character information (character image, character sound, character information for each growth level) corresponding to the matching battery ID. The selector 546 registers the selected character information in the collection information of the user DB 566 and allows the information provider 548 to provide the selected character information to the user U.

The information provider 548 generates information on the anthropomorphic character or the item selected by the selector 546, and transmits the generated information to the vehicle M or the terminal apparatus 400 so as to be provided to the user U. The information provider 548 may transmit the information managed by the manager 550, the information corresponding to the acquisition request from the user U, and the information stored in the server-side storage 560 to the vehicle M or the terminal apparatus 400 so as to be provided to the user U.

The manager 550 manages the type of the anthropomorphic character or the item provided to each user U. The manager 550 may adjust the growth level of the anthropomorphic character or the item on the basis of the history information of the user U included in the user DB 566, or may perform management and the like for allowing the anthropomorphic characters to compete with each other.

Processing by Information Providing Server

Next, details of processing by the information providing server 500 will be described in detail. The following sentences describe how information is provided to the user U by the information providing server 500 for each scene.

First Scene

In the first scene, the information providing server 500 outputs collection information of anthropomorphic characters acquired by the user, among anthropomorphic characters correlated with the batteries 40 installed in the vehicle M, from the terminal apparatus 400 or the vehicle M so as to be provided to the user U. FIG. 11 is a diagram for explaining the content of information provision in the first scene. Images illustrated in FIG. 11 are examples of a display mode and the content, type, and layout included in the images are not limited thereto.

In the first scene, for example, when there is an acquisition request for collection information from the vehicle M or the terminal apparatus 400, the information provider 548 refers to the user ID of the user DB 566 on the basis of the user ID acquired from the vehicle M or the terminal apparatus 400, and generates, for example, the images as illustrated in FIG. 11 on the basis of collection information correlated with a matching user ID. The information provider 548 transmits the generated images to the vehicle M or the terminal apparatus 400, which has made the acquisition request, thereby providing the collection information to the user U.

The example of FIG. 11 illustrates the images in which anthropomorphic characters collected by the user U among anthropomorphic characters grouped by predetermined attributes are arranged in a horizontal row for each group ID. In the example of FIG. 11, an idol character, a local character, and a monster character are illustrated as the predetermined attributes, but other than these, an animation character, an insect character, an animal character, and the like may be included. In the example of FIG. 11, information on a character ID (for example, CH001) and a battery ID (for example, BAT001) or a charging facility ID correlated with the character ID (for example, CS001) of one anthropomorphic character belonging to each group are displayed for each rectangular area arranged horizontally.

The information provider 548 may display the total number of anthropomorphic characters for each group and the number of anthropomorphic characters acquired by the user, on the basis of the collection information. The example of FIG. 11 illustrates that the number of users U, who have acquired the anthropomorphic characters, of an idol character group is 2 out of 48.

The information provider 548 displays the acquired anthropomorphic character as a character image. The information provider 548 may generate information indicating acquisition conditions for acquiring anthropomorphic characters that have not been acquired, and provide the generated information to the user U. The example of FIG. 11 illustrates information indicating that the character ID "CH002" not acquired by the user U can be acquired by purchasing the battery ID "BAT002" and the character ID "CH004" can be acquired by exchanging an in-vehicle battery with a battery having the battery ID "BAT004". The example of FIG. 11 illustrates information indicating that, in a local character group, the character ID "CH203" can be acquired by charging at a battery spot C (charging facility ID "CS003"). In addition to (or instead of) the anthropomorphic characters, the information provider 548 may allow collection information on items to be displayed in the display mode illustrated in FIG. 11.

The information provider 548 may generate a graphical user interface (GUI) switch in which the aforementioned acquisition conditions have been drawn, and allow the generated GUI switch to be displayed in an area where the anthropomorphic characters are disposed. In such a case, when the user U selects the GUI switch, the information provider 548 may allow detailed information of the acquisition conditions to be displayed. In the example of FIG. 11, GUI switches IC01 to IC04 are displayed. For example, when the GUI switch IC01 is selected by the user U, the information provider 548 generates an image for displaying detailed information such as a character image correlated with the battery ID "BAT002", a price, an inventory status, and position information of a store selling a purchasable battery, and provides the generated image to the user U. When the GUI switch IC03 is selected by the user U, the information provider 548 generates an image for displaying detailed information such as the position of the battery spot C, a current congestion status, a distance from the current position of the vehicle M to the battery spot C, a traveling time, and a route, and provides the generated image to the user U. Instead of the images illustrated in FIG. 11, the information provider 548 may provide a list in which the anthropomorphic characters are arranged in the order of characteristics, attack power, acquisition, IDs, and the like.

The manager 550 manages the degree of collection for each group on the basis of the aforementioned collection information. The manager 550 gives a privilege to the user U on the basis of the number of anthropomorphic characters collected in the group, or the total number, type and the like of the collected anthropomorphic characters. For example, the manager 550 gives a higher price, a better service, or more points as the number of collected anthropomorphic characters increases. When all the anthropomorphic characters in the group are collected, the manager 550 may give a scarce character or item. The information provider 548 may generate information on what kind of privilege can be obtained by collecting which anthropomorphic character, and provide the generated information to the user U.

The information provider 548 may generate an image including information on ranking (for example, ranking of the number of collected characters and a collection rate for each group) on the basis of the degree of collection managed by the manager 550, and allow the vehicle M or the terminal apparatus 400 to output the generated image, thereby providing the information to the user U. With this, it is possible to improve the battery collection motivation of the user U for increasing the ranking.

Processing Flow

Figure 12:
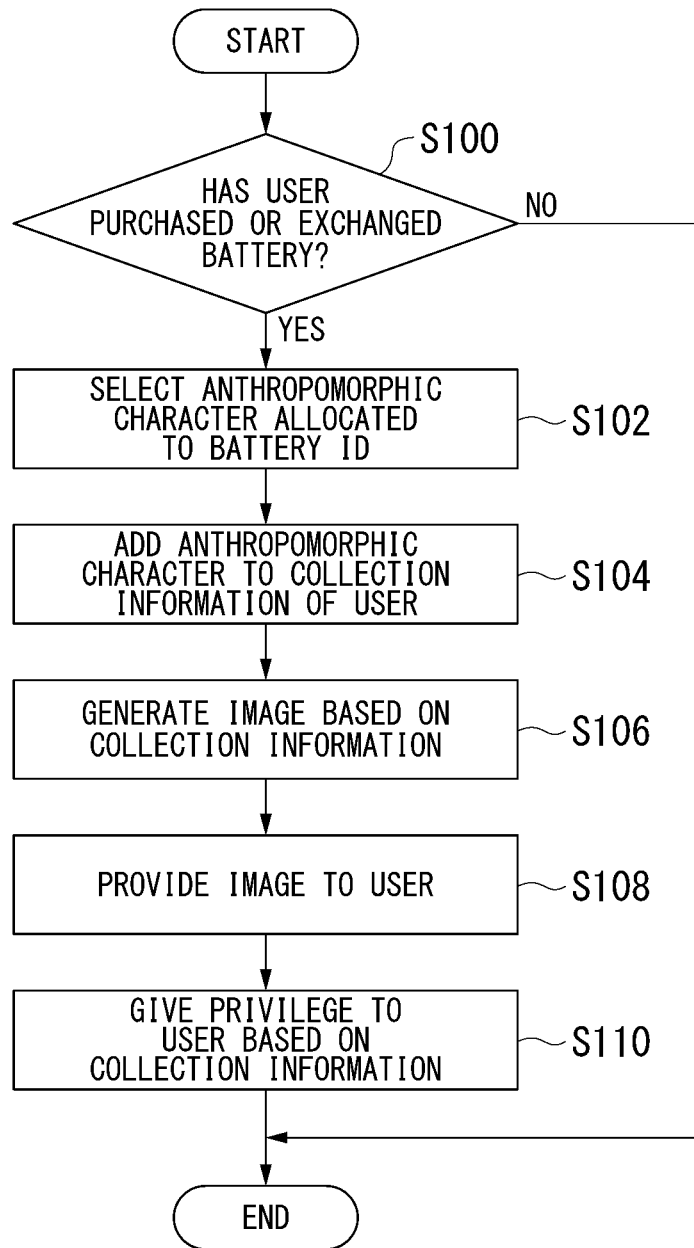
FIG. 12 is a flowchart illustrating an example of the flow of a series of processing by the information providing server in the first scene.

FIG. 12 is a flowchart illustrating an example of the flow of a series of processing by the information providing server 500 in the first scene. In the example of FIG. 12, it is assumed that the allocator 542 has allocated anthropomorphic characters to battery IDs. In the first scene, the acquirer 544 of the information providing server 500 determines whether the user U has purchased or exchanged a battery, on the basis of information acquired from the battery selling store terminal 300 or purchase history acquired from the vehicle M (step S100). When it is determined that the user U has purchased or exchanged the battery, the selector 546 selects the anthropomorphic character allocated to the battery ID among a plurality of anthropomorphic characters (step S102).

Next, the manager 550 adds the selected anthropomorphic character to the collection information of the user U (step S104). Next, the information provider 548 generates an image (for example, the image illustrated in FIG. 11) for the collection information of the user U on the basis of an instruction and the like from the user U (step S106), and outputs the generated image to the vehicle M or the terminal apparatus 400 so as to be provided to the user U (step S108). Next, the manager 550 gives a privilege to the user U on the basis of the collection information (step S110). With this, the processing of the present flow ends. In the process of step S100, when it is determined that the user U has not purchased or exchanged the battery, the processing of the present flow ends.

In the process of step S100 of FIG. 12, instead of the determination regarding whether the user U has purchased or exchanged the battery, it may be determined whether the user U has charged the battery 40 in the charging facility or whether the user U has moved the vehicle M to a predetermined position. In such a case, in the process of step S102, the selector 546 selects an anthropomorphic character allocated to the charging facility or the position. In the process of step S102, an item may be selected instead of the anthropomorphic character.

In the aforementioned first scene, by providing the collection information of the anthropomorphic character correlated with the battery 40, the information providing server 500 can improve a motivation to purchase, exchange, or charge the battery 40 in order to acquire various anthropomorphic characters. Consequently, it is possible to promote better use and recovery of the batteries installed in the vehicle M. As a consequence, it is possible to promote the reuse and the like of the batteries and to more effectively utilize battery resources.

Second Scene

In the second scene, the information providing server 500 changes anthropomorphic characters by combining anthropomorphic characters acquired by the user U and other anthropomorphic characters or items, or generates new anthropomorphic characters, and allows the vehicle M or the terminal apparatus 400 to output information on the anthropomorphic characters so as to be provided to the user U.

Figure 13:
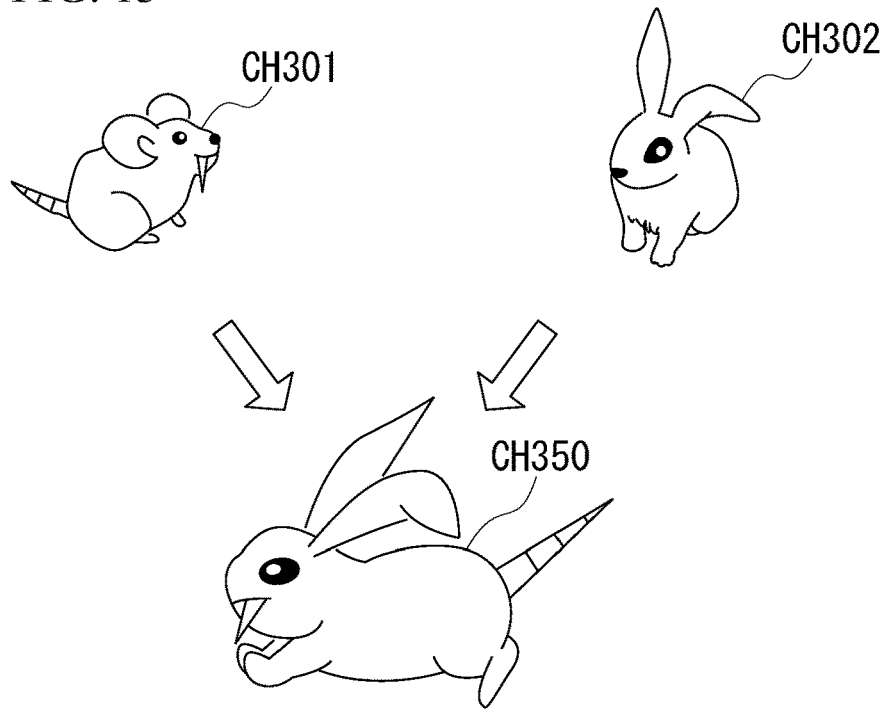
FIG. 13 is a diagram (part 1) for explaining the content of information provision in a second scene.
Figure 14:
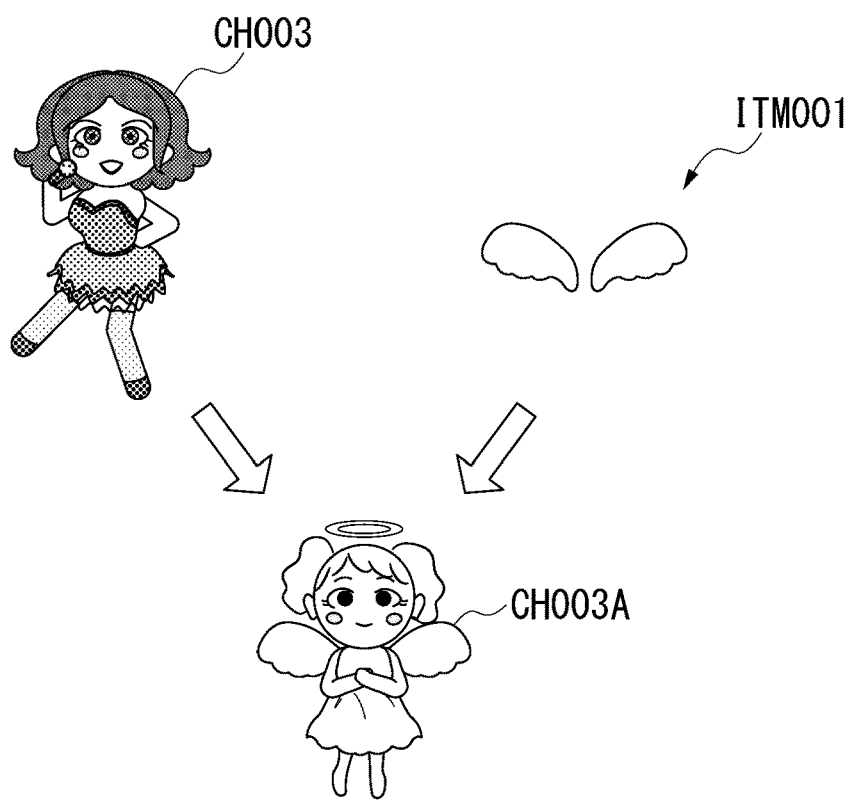
FIG. 14 is a diagram (part 2) for explaining the content of information provision in the second scene.

FIG. 13 and FIG. 14 are diagrams (part 1 and part 2) for explaining the content of information provision in the second scene.

In the second scene, the information provider 548 refers to the collection information of the user DB 566 on the basis of an instruction from the user U, a predetermined timing, and the like, and merges the anthropomorphic characters collected by the user U or anthropomorphic characters and items, thereby changing the anthropomorphic character or generating a new anthropomorphic character. The instruction from the user U is, for example, an instruction of the user U to move a character image of one of two anthropomorphic characters to be merged to a display area of a character image of the another anthropomorphic character. The predetermined timing is, for example, a timing at which two anthropomorphic characters that can be merged have been acquired, a timing at which a predetermined period has elapsed, a timing at which the anthropomorphic character has reached a predetermined growth level, and the like, in the image illustrated in FIG. 11. When anthropomorphic characters or items that can be merged have been acquired, the information provider 548 may inquire of the vehicle M or the terminal apparatus 400 about whether the user U desires a merge, and when a merge instruction is received from the user U, the information provider 548 may perform a merge.

On the basis of the growth level and characteristic information of anthropomorphic characters or items before being merged, which are managed by the manager 550, the information provider 548 changes one or both of a display mode and characteristic information of an image of the merged anthropomorphic character. The information provider 548 may acquire information (for example, a character image or a character sound) on the changed anthropomorphic character or the newly generated anthropomorphic character from the character DB 562. The information provider 548 transmits information on the merged anthropomorphic character to the vehicle M or the terminal apparatus 400 so as to be provided to the user U. The manager 550 registers the information on the merged anthropomorphic character in the collection information of the user DB 566.

In the example of FIG. 13, a new anthropomorphic character CH350 is generated by merging the anthropomorphic character CH301 and the anthropomorphic character CH302 acquired by the user U. In the example of FIG. 14, an anthropomorphic character CH003A changed into an angel is generated by merging the idol anthropomorphic character CH003 acquired by the user U and an item ITM001 corresponding to wings of the angel.

In the second scene, when the anthropomorphic characters are merged, the information provider 548 allows the characteristics and the like of the anthropomorphic characters and items before being merged to be inherited. For example, when the characteristics of the two anthropomorphic characters before being merged are "fire system" and "wind system", the information provider 548 generates a new anthropomorphic character having a characteristic of "flame system" in which fire has been strengthened after the merge. When the characteristics of the two anthropomorphic characters are both "attack type", the information provider 548 generates an anthropomorphic character with greatly increased attack power. When the characteristics of the two anthropomorphic characters before being merged have attributes that conflict (cancel each other), the information provider 548 generates a new anthropomorphic character with poor characteristics. The conflicting attributes are, for example, a case, where the characteristics of the two anthropomorphic characters are "fire attribute" and "water attribute", and the like. The information provider 548, for example, may marry (another example of the merge) male and female anthropomorphic characters, thereby generating a childlike anthropomorphic character inheriting both characteristics.

The information provider 548 may suppress a merge between predetermined groups, or may suppress a merge by combining the growth levels, characteristics and the like of anthropomorphic characters or items. In such a case, the information provider 548 provides the user U with information indicating that a merge is not possible.

Processing Flow

Figure 15:
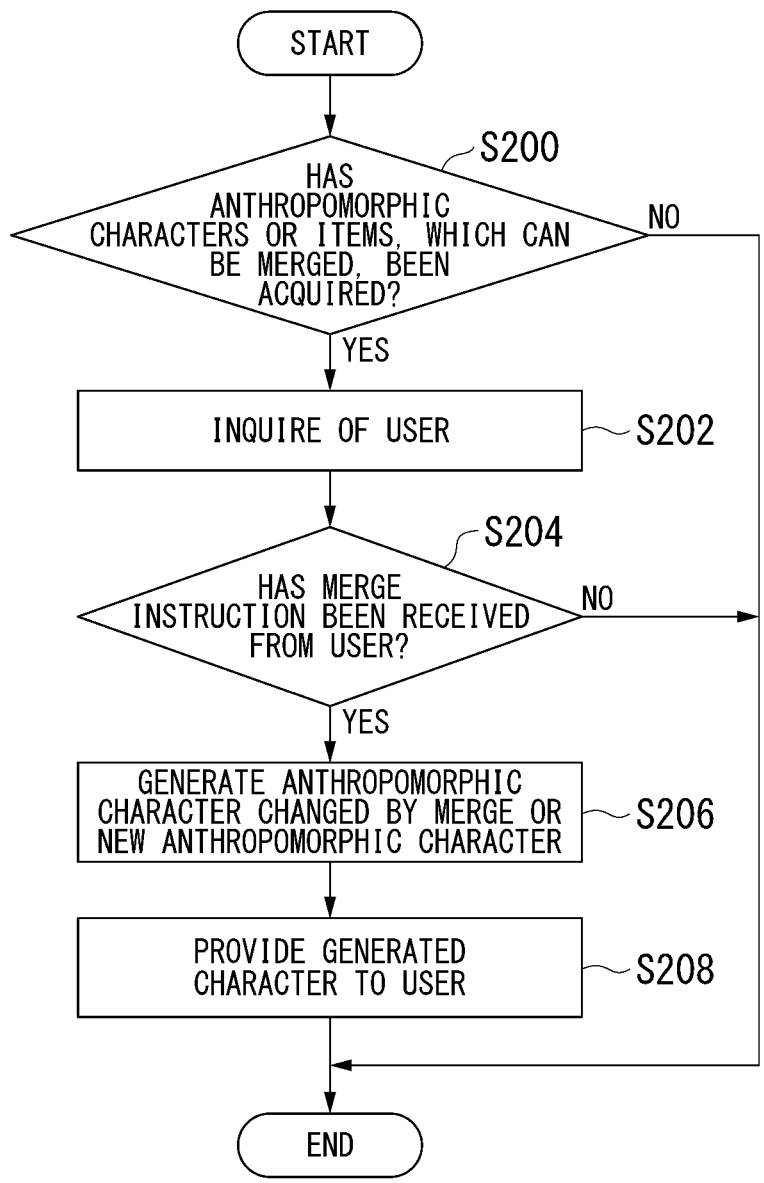
FIG. 15 is a flowchart illustrating an example of the flow of a series of processing by the information providing server in the second scene.

FIG. 15 is a flowchart illustrating an example of the flow of a series of processing by the information providing server 500 in the second scene. In the second scene, the acquirer 544 determines whether anthropomorphic characters or items, which can be merged, have been acquired (step S200). When it is determined that the anthropomorphic characters or items, which can be merged, have been acquired, the acquirer 544 inquires of the vehicle M or the terminal apparatus 400 about whether the user U desires a merge (step S202), and determines whether a merge instruction has been received from the user U (step S204).

When it is determined that the merge instruction has been received from the user U, the information provider 548 generates an anthropomorphic character changed by the merge or a new anthropomorphic character (step S206), and provides information on the generated anthropomorphic character to the user U (step S208). With this, the processing of the present flow ends. When it is determined in the process of step S200 that the anthropomorphic characters or items, which can be merged, have not been acquired or when it is determined in the process of step S204 that the merge instruction has not been received from the user U, the processing of the present flow ends.

In the aforementioned second scene, the information providing server 500 has the same effect as the information provision in the first scene by merging anthropomorphic characters, or anthropomorphic characters and items, and can acquire a further scarce anthropomorphic character, thereby further improving a motivation to purchase, exchange, or charge the battery 40.

Third Scene

Figure 16:
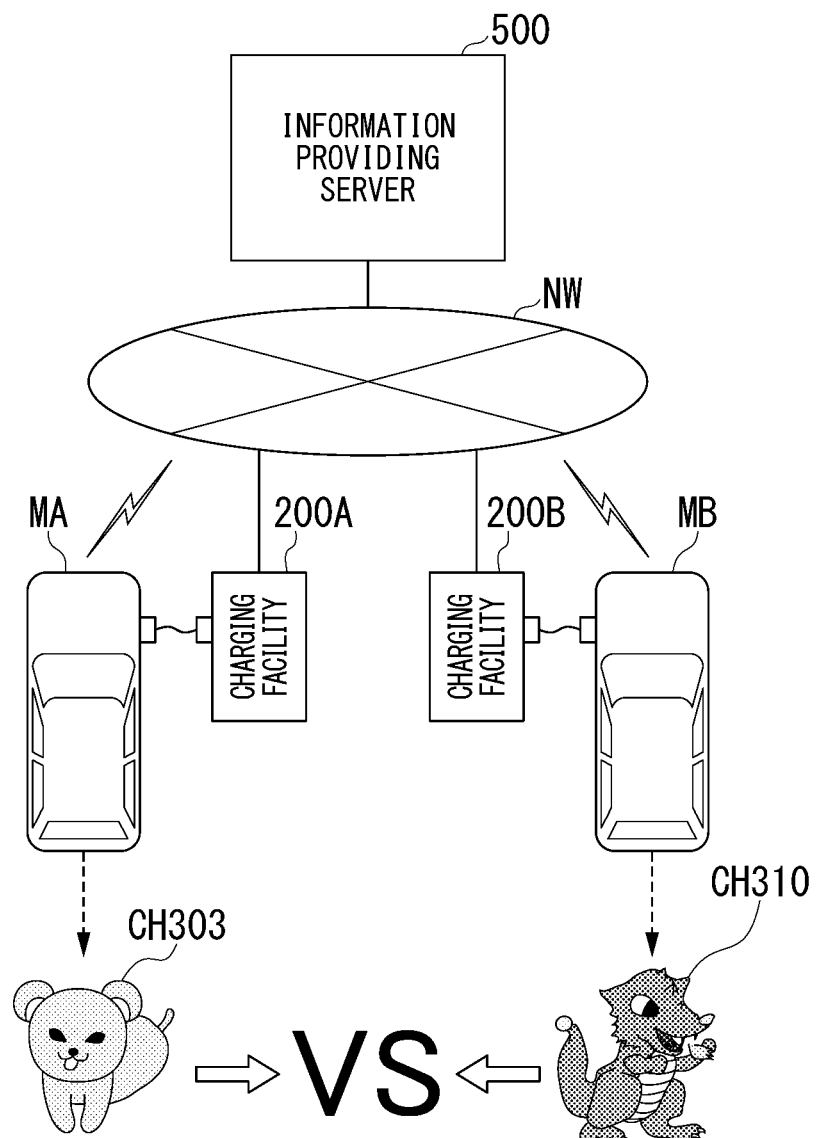
FIG. 16 is a diagram for explaining the content of information provision in a third scene.

In the third scene, the information providing server 500 provides the user U with information on a competition between an anthropomorphic character correlated with the battery 40 installed in the vehicle M and another anthropomorphic character. FIG. 16 is a diagram for explaining the content of information provision in the third scene.

In the third scene, the information provider 548, for example, allows anthropomorphic characters correlated with the batteries 40 installed in vehicles connected to the charging facilities 200 to compete with each other. In the example of FIG. 16, it is assumed that two charging facilities 200A and 200B are connected to the network NW, and the charging facilities 200A and 200B are connected to a vehicle MA and a vehicle MB, respectively, and supply power to the battery 40 of each vehicle such that the battery 40 is charged.

The charging facilities 200A and 200B transmit information on the vehicles MA and MB being charged and information on the battery being charged to the information providing server 500 via the network NW. Instead of the charging facilities 200A and 200B, each of the vehicles MA and MB may transmit information on the vehicle and the battery to the information providing server 500.

The acquirer 544 of the information providing server 500 acquires the information on the vehicles MA and MB or the information on the battery being charged from the charging facilities 200A and 200B or the vehicles MA and MB. On the basis of the information acquired by the acquirer 544, the information provider 548 generates an image (competition image) in which the anthropomorphic character CH303 correlated with the battery 40 being charged in the vehicle MA and an anthropomorphic character CH310 correlated with the battery 40 being charged in the vehicle MB compete with each other. The information provider 548 may inquire of the user U about whether to perform a competition, and generate a competition image when an instruction for performing a competition is received. The information provider 548 transmits the generated image to the vehicles MA and MB, or the terminal apparatus 400 of the user of each vehicle. In such a case, the information provider 548 may generate an animation image of a competition scene and transmit the generated image to the vehicles MA and MB, or the terminal apparatus 400 of the user of each vehicle.

The information provider 548 adjusts attack power or defense power by the growth levels, characteristics and the like of the anthropomorphic characters to be competed, and determines winning or defeat on the basis of the attack power or the defense power. When determining the winning or defeat, it is preferable that the information provider 548 determines the winning or defeat before charging of the battery installed in at least one of vehicles correlated with the anthropomorphic characters being competed is completed. With this, it is possible to prevent the charging facility 200 from being occupied and congested after the charging until the winning or defeat occurs.

The information provider 548 may continuously provide a competition status even after the charging (state in which the vehicle M is not connected to the charging facility 200), instead of determining the winning or defeat before the charging is completed.

When it is determined that information on a competition is not provided at the present time due to an instruction from the user U or because predetermined conditions are satisfied, the information provider 548 may temporarily store information on the competition status in the server-side storage 560, and provide the user U with the information on the competition status due to the instruction from the user U after a predetermined time elapses. The predetermined conditions are, for example, that the user U is not able to view the competition image during charging and the SOC is equal to or more than a predetermined value and time until full charge is predicted to be a predetermined time or less. With this, it is possible to provide competition content at a timing at which the user U wants to see.

When the winning or defeat of the competition is determined, the information provider 548 transmits information on the winning or defeat to the vehicles MA and MB, or the terminal apparatus 400 of the user of each vehicle.

Figure 17:
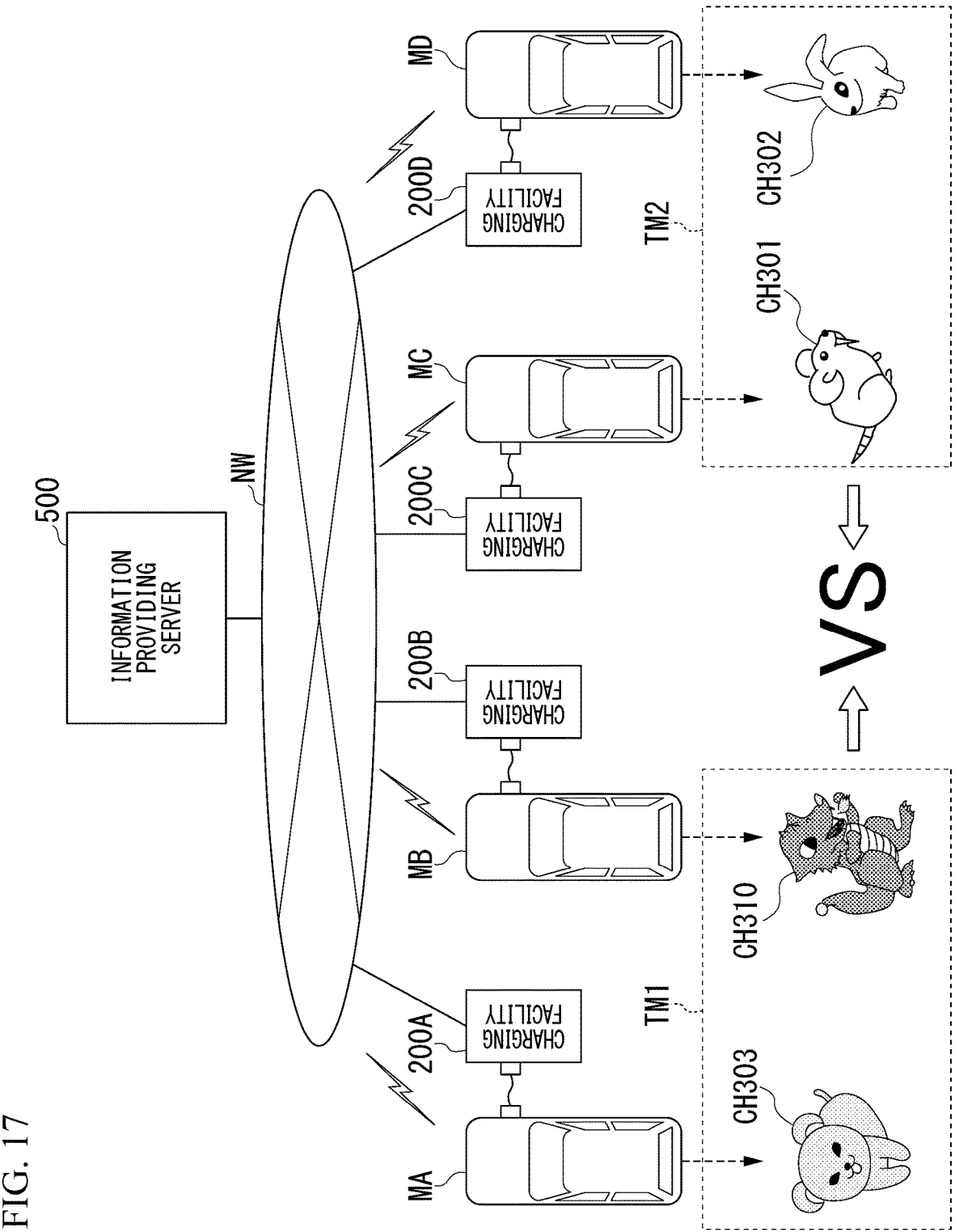
FIG. 17 is a diagram for explaining a state of a team competition in the third scene.

The information provider 548 performs a competition of the anthropomorphic characters correlated with the two vehicles MA and MB, but, instead of this, the information provider 548 may provide information on a team competition between a plurality of anthropomorphic characters. FIG. 17 is a diagram for explaining a state of a team competition in the third scene. In the example of FIG. 17, it is assumed that vehicles MA to MD are connected to charging facilities 200A to 200D, respectively, and the battery 40 installed in each vehicle is being charged. The charging facilities 200A to 200D or the vehicles MA to MD transmit information on the vehicles and information on the battery being charged to the information providing server 500 via the network NW.

The acquirer 544 of the information providing server 500 acquires the information on the vehicles and the information on the battery from the charging facilities 200A to 200D or the vehicles MA to MD. Then, on the basis of the information on the vehicles and the information on the battery, which has been acquired by the acquirer 544, the information provider 548 determines a team to perform a competition with anthropomorphic characters.

For example, the information provider 548 determines a team for each position where the charging facility 200 exists, for example. For example, it is assumed that the charging facilities 200A and 200B exist within a first charging spot (for example, within a predetermined distance) and the charging facilities 200C and 200D exist within a second charging spot (for example, within a predetermined distance) different from the first charging spot. In such a case, the information provider 548 forms a team TM1 with the anthropomorphic characters CH303 and CH310 correlated with the batteries charged in the charging facilities 200A and 200B, forms a team TM2 with the anthropomorphic characters CH301 and CH302 correlated with the batteries charged in the charging facilities 200C and 200D, and performs a competition between the teams.

The information provider 548 may form a team for each vehicle manufacturer (maker), each vehicle type, and each battery type, instead of (or in addition to) the aforementioned team determination method. The information provider 548 forms a team on the basis of at least one of the positions of the charging facilities 200, the type of the vehicle M in which the batteries 40 are installed, a manufacturer, and the types of the batteries 40.

The information provider 548 generates an image in which the anthropomorphic characters compete with each other between the teams, and transmits the generated image to the vehicles MA and MB, or the terminal apparatus 400 of the user of each vehicle. The information provider 548 may generate an animation image in which a merged attack and the like are performed according to the type, level, and characteristics of the anthropomorphic character in the team. It is possible to provide the user U with various types of competition performance on the basis of the anthropomorphic character included in the team.

The information provider 548 comprehensively compares the levels, characteristics, combinations, and the like of the anthropomorphic characters for each team, and determines the winning or defeat in the teams.

The information provider 548 registers competition results of the anthropomorphic characters in, for example, the history information of the user DB 566 as competition history. On the basis of the competition results, the manager 550 gives a privilege to a user (hereinafter, referred to as a "winning user") of the vehicle provided with the battery correlated with the anthropomorphic character that has won the competition. The privilege is, for example, a privilege related to battery charging, and specifically, a discount on the charge related to battery charging used by the winning user, an addition of many service points for the charge, and the like. The privilege may include a privilege obtained from a user (hereinafter, referred to as a "defeated user") of the vehicle provided with the battery correlated with the anthropomorphic character that has defeated the competition. For example, the manager 550 adds a part of service points held by the defeated user to the service points of the winning user. The manager 550 may allow the defeated user to impose a part of the charge related to the battery charging used by the winning user.

The manager 550 may give an experience value for the winning anthropomorphic character, give an item according to the experience value, or increase the growth level. On the basis of the competition history, the manager 550 manages competition results (competition records) for each user or each anthropomorphic character.

On the basis of the competition records managed by the manager 550, the information provider 548 may generate an image including information on ranking related to the competition records (for example, winning number ranking, winning percentage ranking, or experience value ranking), and transmit the generated image to the vehicle M or the terminal apparatus 400 so as to be provided to the user U. With this, it is possible to improve a competition motivation of the user U for increasing the ranking. It is possible to promote the use of the charging facilities 200.

The information provider 548 may transmit information on a competition tournament and the like to the vehicle M regularly or at a predetermined timing. With this, the user U can be promoted to move to places such as the charging facilities 200, and thus the use of the charging facilities 200 can be promoted.

Processing Flow

Figure 18:
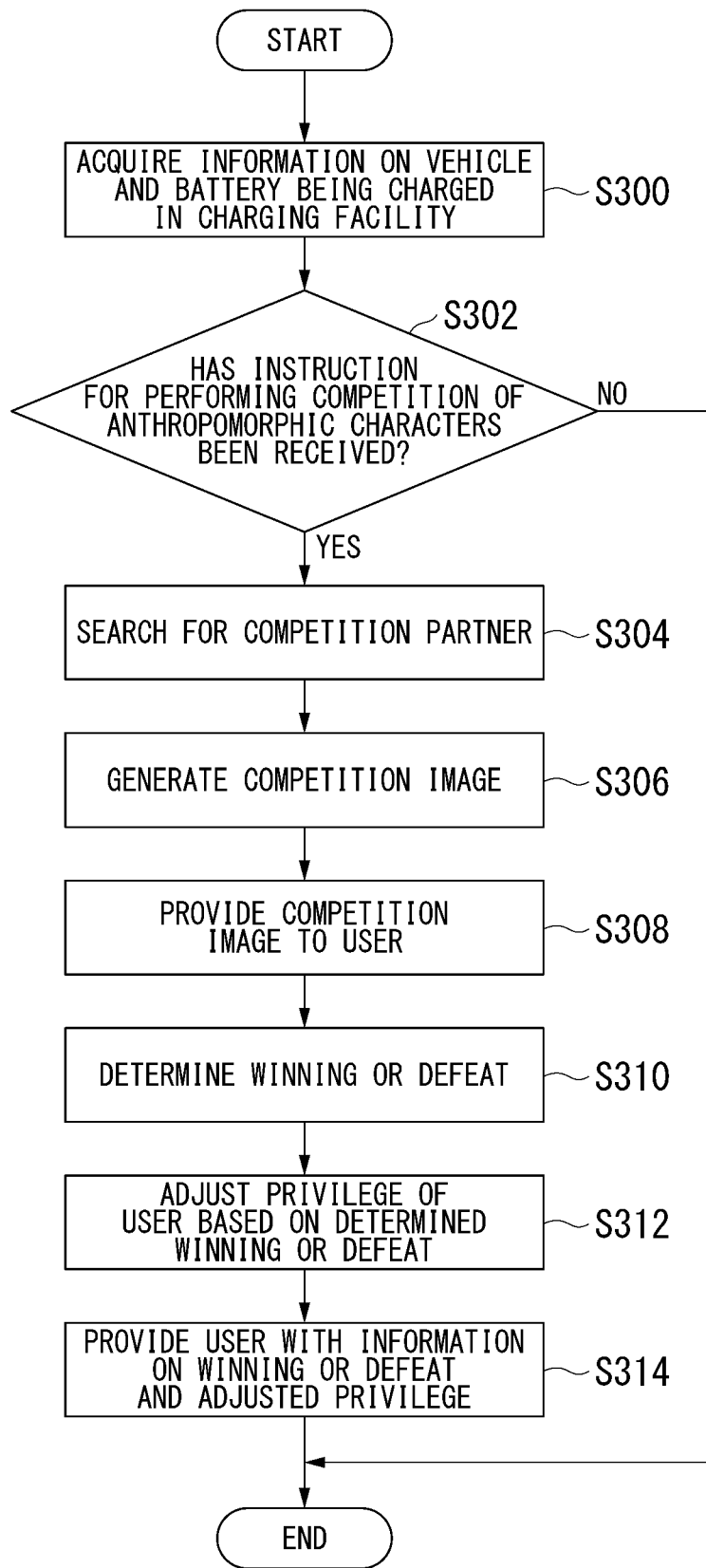
FIG. 18 is a flowchart illustrating an example of the flow of a series of processing by the information providing server in the third scene.

FIG. 18 is a flowchart illustrating an example of the flow of a series of processing by the information providing server 500 in the third scene. In the third scene, the acquirer 544 acquires information on a vehicle and a battery being charged in the charging facility 200 (step S300). Next, the acquirer 544 determines whether an instruction for performing a competition of anthropomorphic characters has been received (step S302). When it is determined that the instruction for performing the competition of the anthropomorphic characters has been received, the information provider 548 searches for a competition partner (step S304), and generates a competition image with the extracted competition partner (step S306). The competition partner is preferably an anthropomorphic character correlated with a battery of another vehicle M being charged at the same time, but may be, for example, an anthropomorphic character set in advance according to the growth level, characteristics, and the like. Next, the information provider 548 transmits the generated competition image to the vehicle M or the terminal apparatus 400 so as to be provided to the user U (step S308).

Next, the information provider 548 determines the winning or defeat (step S310), and allows the manager 550 to adjust the privilege of the user U on the basis of the determined winning or defeat (step S312). Next, the information provider 548 transmits information on the adjusted privilege to the vehicle M or the terminal apparatus 400 so as to be provided to the user U (step S314). With this, the processing of the present flow ends. In the process of step S302, when it is determined that the instruction for performing the competition has not been received, the processing of the present flow ends.

In the aforementioned third scene, the information providing server 500 has the same effect as the information provision in the first scene, and can provide information for entertaining the user U during the waiting time by providing information that anthropomorphic characters compete with each other during the charging waiting time of the battery 40. The information providing server 500 can give a privilege on the basis of the competition results to allow the user U to move to a predetermined charging facility 200, thereby improving a motivation for charging the battery 40. By providing a mechanism for performing not only individual competitions but also team competitions, it is possible to provide the information in various modes. As a consequence, it is possible to further improve a motivation of the user U for purchasing or exchanging a battery or performing charging. By providing the information in the third scene, it is possible to promote an interaction based on anthropomorphic characters with other users. The information providing server 500 can provide a competition of anthropomorphic characters during charging not only in realtime, but also at the timing at which the user U wants to view.

Fourth Scene

In the fourth scene, the information providing server 500 gives or grows (including nurtures and evolves) an anthropomorphic character correlated with information related to the vehicle M on the basis of the history information (for example, traveling history and the like) of the vehicle M, and allows the vehicle M or the terminal apparatus 400 to output information on the anthropomorphic character so as to be provided to the user U. The information related to the vehicle M is, for example, the user U, the vehicle M, an in-vehicle device, history information, and the like. That is, the anthropomorphic character in the fourth scene may be correlated with something other than the battery 40, or may be correlated with a position where the vehicle M has traveled in the travel history, for example.

Figure 19:
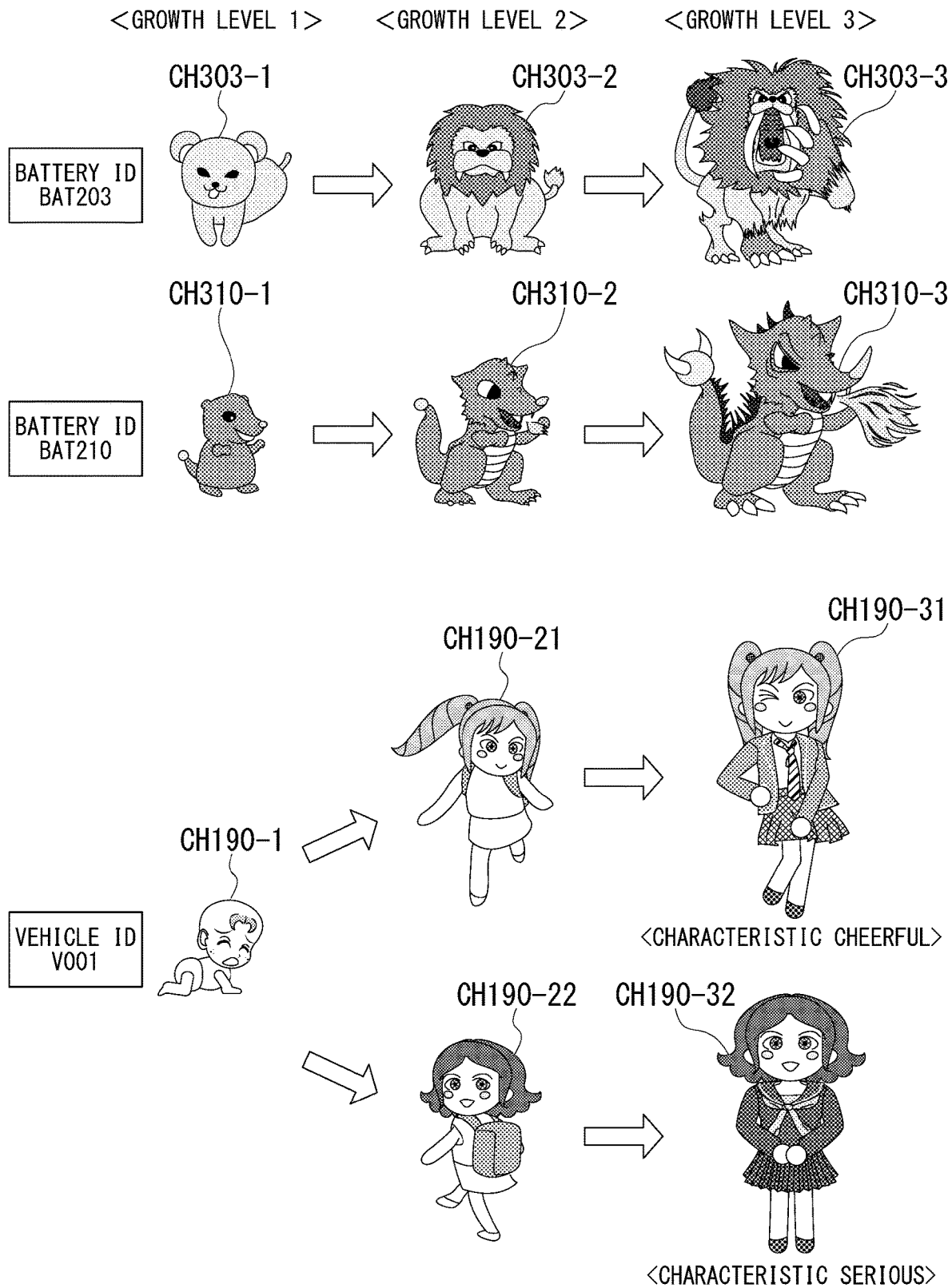
FIG. 19 is a diagram for explaining the content of information provision in a fourth scene.

FIG. 19 is a diagram for explaining the content of information provision in the fourth scene. The example of FIG. 19 illustrates the state of the growth of the anthropomorphic characters CH303 and CH310 correlated with one or more batteries (battery IDs "BAT203" and "BAT210") installed in the vehicle M and an anthropomorphic character CH190 correlated with the vehicle M (vehicle ID "V001"). The example of FIG. 19 illustrates the state of the growth at growth levels 1 to 3, but the number of levels is not limited thereto.

In the fourth scene, the information provider 548 gives or grows anthropomorphic characters on the basis of the history information of the user DB 566. For example, when an in-vehicle device such as the battery 40 is purchased or exchanged on the basis of the purchase history included in the user DB 566, the information provider 548 gives an anthropomorphic character corresponding to the in-vehicle device. On the basis of the traveling history of the vehicle M, the information provider 548 gives an anthropomorphic character correlated with a position (point) where the vehicle M has traveled or the number of times by which the vehicle M has passed through the position. The information provider 548 may give the anthropomorphic characters on the basis of the surrounding environment of the vehicle M included in the traveling history (for example, a hot area, a cold area, a storm, or a thunderstorm). The surrounding environment may be set on the basis of, for example, vehicle exterior temperature detected by the vehicle sensor 20, weather information, season, positions, and the like. For example, when the traveling point is the hot area, the information provider 548 gives an anthropomorphic character having a characteristic of "fire attribute", and when the traveling point is a seaside, the information provider 548 gives an anthropomorphic character having a characteristic of "water attribute" and a shape imitating a creature of the sea.

For example, on the basis of the traveling status such as the accelerator opening, the brake stepping amount, and the vehicle speed included in the traveling history, the information provider 548 gives an anthropomorphic character having a characteristic of "attack type" when the frequency of acceleration/deceleration with respect to a predetermined traveling distance or traveling section traveled by the user U is equal to or more than a predetermined frequency, or gives an anthropomorphic character having a characteristic of "defense type (healing system)" when the frequency of the acceleration/deceleration is smaller than the predetermined frequency.

The information provider 548 may give the anthropomorphic character on the basis of the charge/discharge status (charge/discharge history) of the battery 40 included in the history information.

The information provider 548 grows the anthropomorphic character when predetermined growth conditions are satisfied on the basis of the traveling history, purchase history, and charge/discharge history included in the user DB 566. The predetermined growth conditions include, for example, having traveled a predetermined distance or more or a predetermined time or more, having passed through a predetermined point, having purchased or exchanged a predetermined device, and having being charged in a predetermined charging facility 200. The growth conditions may include the driving state of the user U, the surrounding environment of the vehicle M during traveling, and the like. The "growing the anthropomorphic character" represents, for example, changing the display mode of a character image such that the user U can recall that the anthropomorphic character is growing. In the example of FIG. 19, the shapes of the character images of the anthropomorphic characters CH303, CH310, and CH190 are set to be larger on the basis of the growth levels of the anthropomorphic characters. The "growing the anthropomorphic character" may include a change in the display mode that recalls the growth such as stretching the limbs of the anthropomorphic character and holding a weapon, protective equipment, or an item. The "growing the anthropomorphic character" may also include changing characteristics correlated with the anthropomorphic character, giving new characteristics, increasing attack power, increasing defense power, and the like.

The information provider 548 may change the growth process and content of the anthropomorphic character on the basis of the history information. For example, on the basis of the accelerator opening, the brake stepping amount, the vehicle speed, and the like included in the traveling history, the information provider 548 increases the attack power of the anthropomorphic character when the frequency of acceleration/deceleration with respect to a predetermined traveling distance or traveling section traveled by the user U is equal to or more than a predetermined frequency, or increases the defense power of the anthropomorphic character when the frequency of the acceleration/deceleration is smaller than the predetermined frequency.

For example, in the case of traveling in a hot area for a predetermined distance or more and growing an anthropomorphic character having a characteristic of "fire attribute", the information provider 548 increases an increase rate of the attack power or the defense power of the anthropomorphic character as compared with other attributes. On the other hand, in the case of traveling in a hot area for a predetermined distance or more and growing an anthropomorphic character having a characteristic of "water attribute", the information provider 548 decreases an increase rate of the attack power or the defense power of the anthropomorphic character as compared with other attributes, and changes the characteristic to a "soil attribute".

In FIG. 19, the anthropomorphic character CH190 has the same display mode at the growth level 1, but characters CH190-21 and CH190-22 having different display modes are generated at the growth level 2 on the basis of the traveling status, and characters CH190-31(characteristic: cheerful) and CH190-32 (characteristic: serious) having different display modes and characteristics are generated at the growth level 3.

The information provider 548 may receive accounting information from the user U, and give an anthropomorphic character or grow the anthropomorphic character. Information on the giving or growth of the anthropomorphic character by the information provider 548 is managed in the user DB 566 and the like by the manager 550.

Processing Flow

FIG. 20 is a flowchart illustrating an example of the flow of a series of processing by the information providing server 500 in the fourth scene. In the example of FIG. 20, it is assumed that an anthropomorphic character correlated with information related to the vehicle M has already been provided. In the fourth scene, the information provider 548 refers to the history information of the user DB 566 (step S400) and determines whether to grow the anthropomorphic character (step S402). When it is determined to grow the anthropomorphic character, the information provider 548 changes one or both the growth level and the characteristic information of the anthropomorphic character (step S404). In the process of step S404, the information provider 548 may update the collection information of the user DB 566 according to the changed content.

Next, the information provider 548 provides the grown anthropomorphic character to the user U (step S406). With this, the processing of the present flow ends. In the process of step S402, when it is determined not to grow the anthropomorphic character, the processing of the present flow ends.

In the aforementioned fourth scene, the information providing server 500 has the same effect as the information provision in the first scene, and can grow the anthropomorphic character in various display modes and characteristics on the basis of the history information on the vehicle M by the user U. Therefore, it is possible for the user U to easily and intuitively understand the traveling status and the like of the vehicle M. The information providing server 500 can promote the user U to use the vehicle in order to acquire or grow the anthropomorphic character.

Modification

The information providing server 500 may combine the information provided in the aforementioned first to fourth scenes with some or all of information provided in other scenes. In the information providing system 1 of the embodiment, the vehicle M side may have at least a part of the plurality of functions implemented by the information providing server 500, or the information providing server 500 may have at least a part of the plurality of functions implemented by the vehicle M.

The information providing server 500 may provide information on an anthropomorphic character according to the degree of deterioration of an in-vehicle device such as the battery 40. In such a case, the information provider 548 provides an image in which the anthropomorphic character is expressed using a plurality of ages. The age may be, for example, a multi-staged age such as infant, child, boy, youth, late middle age, middle age, and old age. As described above, by changing the display mode of the anthropomorphic character according to the degree of deterioration of the battery 40, it is possible for the user U to easily and intuitively understand the degree of deterioration, and to purchase or exchange another battery at an appropriate timing.

The information providing server 500 may change the expression of the anthropomorphic character on the basis of the degree of deterioration or the charging rate of the battery 40, and provide the anthropomorphic character to the user U. In such a case, when the degree of deterioration is small or when the charging rate is large, the information provider 548 allows an image imitating an anthropomorphic character having a smiling expression to be displayed. When the degree of deterioration is large or when the charging rate is small, the information provider 548 provides an image of an anthropomorphic character having a sad expression or a tired expression. With this, it is possible for the user U to intuitively understand the current deterioration state or used state of the battery 40.

When the battery 40 is used in a preferable driving or charging condition, the information providing server 500 may give a character image (scarce character, rare character) with a lower display frequency than usual.

When the battery 40, which is a used item, has been purchased, the information providing server 500 may give an anthropomorphic character grown by the past user to the user who has purchased the battery. With this, since the anthropomorphic character of the used battery is more growing than a new battery, it is possible to improve a motivation of the user U for purchasing the used battery.

The aforementioned embodiment can be expressed as follows.

An information providing apparatus including:
a storage device configured to store a program; and
a hardware processor,
wherein, when the hardware processor executes the program stored in the storage device, anthropomorphic characters are allocated for each type of one or more batteries that store power for allowing a vehicle to travel, information on purchase or exchange of the battery or information on charging of the battery installed in the vehicle is acquired, and the anthropomorphic characters allocated to the batteries are provided on the basis of the acquired information.

Although a mode for carrying out the present invention has been described using the embodiments, the present invention is not limited to such embodiments and various modifications and replacements can be made without departing from the scope of the present invention.

What is claimed is:

1. An information providing apparatus comprising:
a processor;
a memory storing program instructions executable by the processor to:
acquire information on an anthropomorphic character correlated with a battery that stores power for allowing a vehicle to travel, wherein the anthropomorphic character comprises a first group of character attribute images associated with a first group of sounds; and
initiate and provide information on a competition between the anthropomorphic character correlated with the battery and another anthropomorphic character when the vehicle is connected to a charging facility that supplies power to the battery to charge the battery, wherein the another anthropomorphic character comprises a second group of character attribute images associated with a second group of sounds.

2. The information providing apparatus according to claim 1, wherein, when a plurality of vehicles are connected to the charging facility, the processor forms a team for each anthropomorphic character correlated with batteries installed in the plurality of vehicles, and provides a user of the vehicle with information on a competition between the formed teams.

3. The information providing apparatus according to claim 2, wherein the processor forms the team on the basis of at least one of a position of the charging facility, a vehicle type of the vehicle installed with the battery, a manufacturer, and a type of the battery.

4. The information providing apparatus according to claim 1, wherein the processor determines winning or defeat on the basis of characteristic information and growth levels of the anthropomorphic character which compete with each other.

5. The information providing apparatus according to claim 1, wherein the processor gives a privilege to a user of a vehicle installed with a battery correlated with an anthropomorphic character which has won the competition.

6. The information providing apparatus according to claim 5, wherein the privilege, which is given to the user of the vehicle installed with the battery correlated with the anthropomorphic character which has won the competition, includes a privilege acquired from the user of the vehicle installed with the battery correlated with the anthropomorphic character which has defeated the competition.

7. The information providing apparatus according to claim 1, wherein the processor generates information on ranking based on a result of the competition and provides a user of the vehicle with the generated information on ranking.

8. An information providing method causing a computer to perform the steps of:
acquiring, by the computer, information on an anthropomorphic character correlated with a battery that stores power for allowing a vehicle to travel, wherein the anthropomorphic character comprises a first group of character attribute images associated with a first group of sounds; and
initiating and providing, by the computer, information on a competition between the anthropomorphic character correlated with the battery and another anthropomorphic character when the vehicle is connected to a charging facility that supplies power to the battery to charge the battery, wherein the another anthropomorphic character comprises a second group of character attribute images associated with a second group of sounds.

9. A computer readable non-transitory storage medium storing a program causing a computer to perform the steps of:
acquiring, by the computer, information on an anthropomorphic character correlated with a battery that stores power for allowing a vehicle to travel, wherein the anthropomorphic character comprises a first group of character attribute images associated with a first group of sounds; and
initiating and providing, by the computer, information on a competition between the anthropomorphic character correlated with the battery and another anthropomorphic character when the vehicle is connected to a charging facility that supplies power to the battery to charge the battery, wherein the another anthropomorphic character comprises a second group of character attribute images associated with a second group of sounds.

* * * * *